United States Patent
LaRose et al.

(10) Patent No.: US 9,988,102 B2
(45) Date of Patent: Jun. 5, 2018

(54) MODULAR VEHICLE

(71) Applicant: NEW ENGLAND WHEELS, INC., Billerica, MA (US)

(72) Inventors: Paul LaRose, Mansfield, MA (US); Anjani Kumar, Nashua, NH (US); Miteshkumar Hasmukhlal Patel, Nashua, NH (US)

(73) Assignee: NEW ENGLAND WHEELS, INC., Billerica, MA (US)

( * ) Notice: Subject to any disclaimer, the term of this patent is extended or adjusted under 35 U.S.C. 154(b) by 29 days.

(21) Appl. No.: 15/046,553

(22) Filed: Feb. 18, 2016

(65) Prior Publication Data
US 2017/0240215 A1 Aug. 24, 2017

(51) Int. Cl.
*B62D 31/02* (2006.01)
*B62D 65/02* (2006.01)

(52) U.S. Cl.
CPC ......... *B62D 31/025* (2013.01); *B62D 65/024* (2013.01)

(58) Field of Classification Search
CPC ...... B62D 31/02; B62D 47/02; B62D 31/025; B62D 25/06; B62D 31/04; B62D 29/043; B62D 27/026
USPC ....... 296/178, 203.01, 210, 191, 29, 146.16, 296/25, 208, 204, 84.1, 63, 111
See application file for complete search history.

(56) References Cited

U.S. PATENT DOCUMENTS

| | | | | | |
|---|---|---|---|---|---|
| 3,469,881 | A | * | 9/1969 | McNamee | B60P 3/32 296/164 |
| 4,230,361 | A | * | 10/1980 | Nachbur | B62D 29/008 105/406.1 |
| 5,934,739 | A | * | 8/1999 | Waldeck | B61D 17/041 296/178 |
| 6,685,254 | B2 | * | 2/2004 | Emmons | B60G 7/02 296/178 |
| 7,097,232 | B2 | * | 8/2006 | Beaudry | B62D 21/18 180/311 |
| 7,175,202 | B2 | * | 2/2007 | Budica | B60P 3/34 280/781 |
| 7,690,719 | B2 | * | 4/2010 | Goff | B62D 33/046 296/191 |
| 7,862,101 | B2 | * | 1/2011 | Lusk | B60R 16/0207 296/178 |
| 8,414,068 | B1 | * | 4/2013 | Na | B62D 27/023 296/178 |
| 8,910,992 | B2 | * | 12/2014 | Grech | B60J 1/02 296/178 |
| 2005/0269834 | A1 | * | 12/2005 | Toth | B62D 31/02 296/178 |
| 2013/0076069 | A1 | * | 3/2013 | Fuchs | B62D 21/02 296/181.2 |

* cited by examiner

*Primary Examiner* — D Glenn Dayoan
*Assistant Examiner* — Sunsurraye Westbrook
(74) *Attorney, Agent, or Firm* — Seyfarth Shaw LLP; Brian Michaelis

(57) ABSTRACT

A passenger compartment of the modular vehicle, such as a bus, includes a roof panel and sandwich-type side panels coupled to structural joiners to form the passenger compartment. The side panels and the joiners may include pultruded beams for increased structural integrity. A chassis of the vehicle has channels integrated therein for coupling of the side panels and passenger compartment to the chassis. This coupling to the chassis channel may also include the use of a bonding agent.

19 Claims, 37 Drawing Sheets

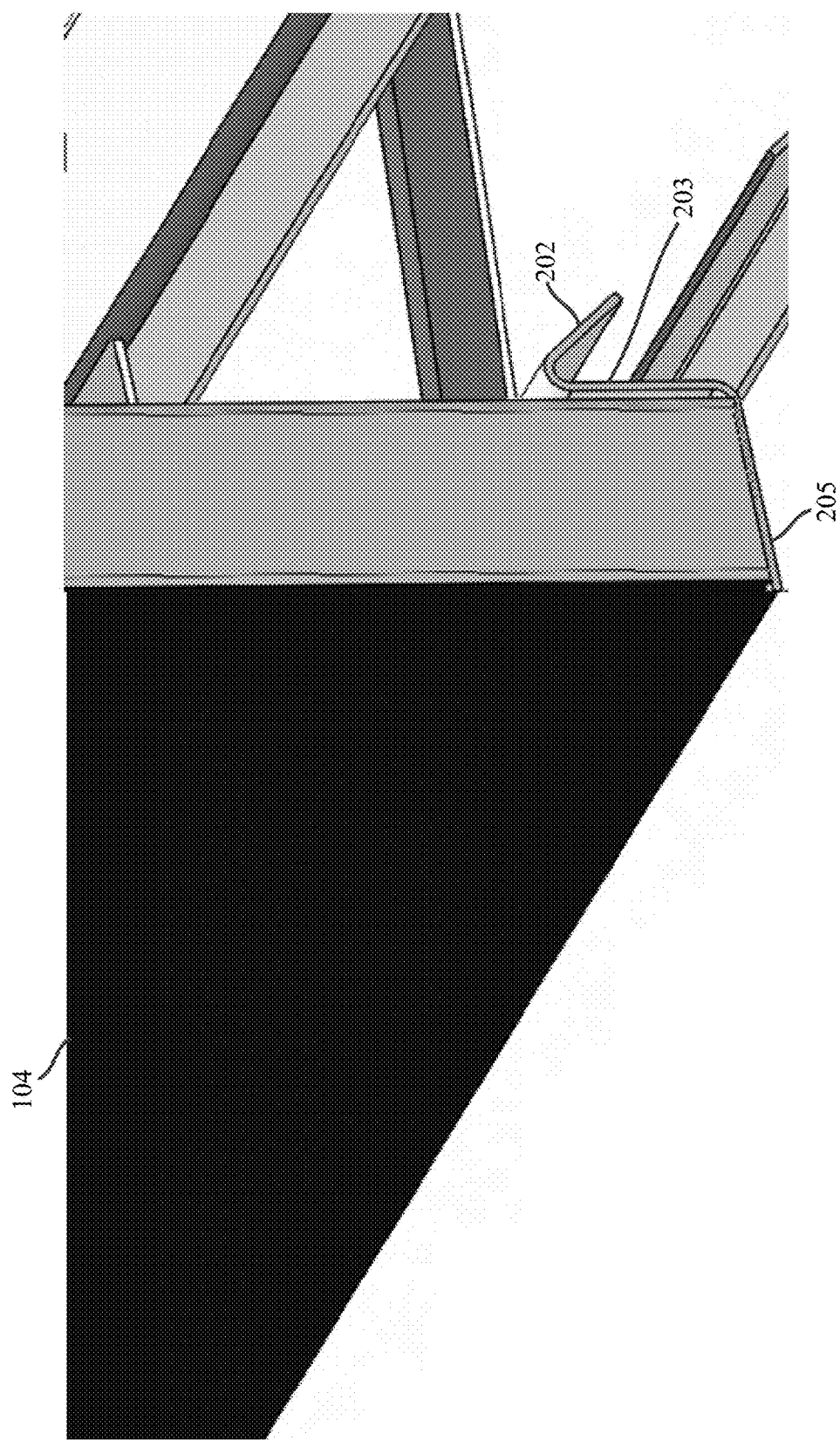

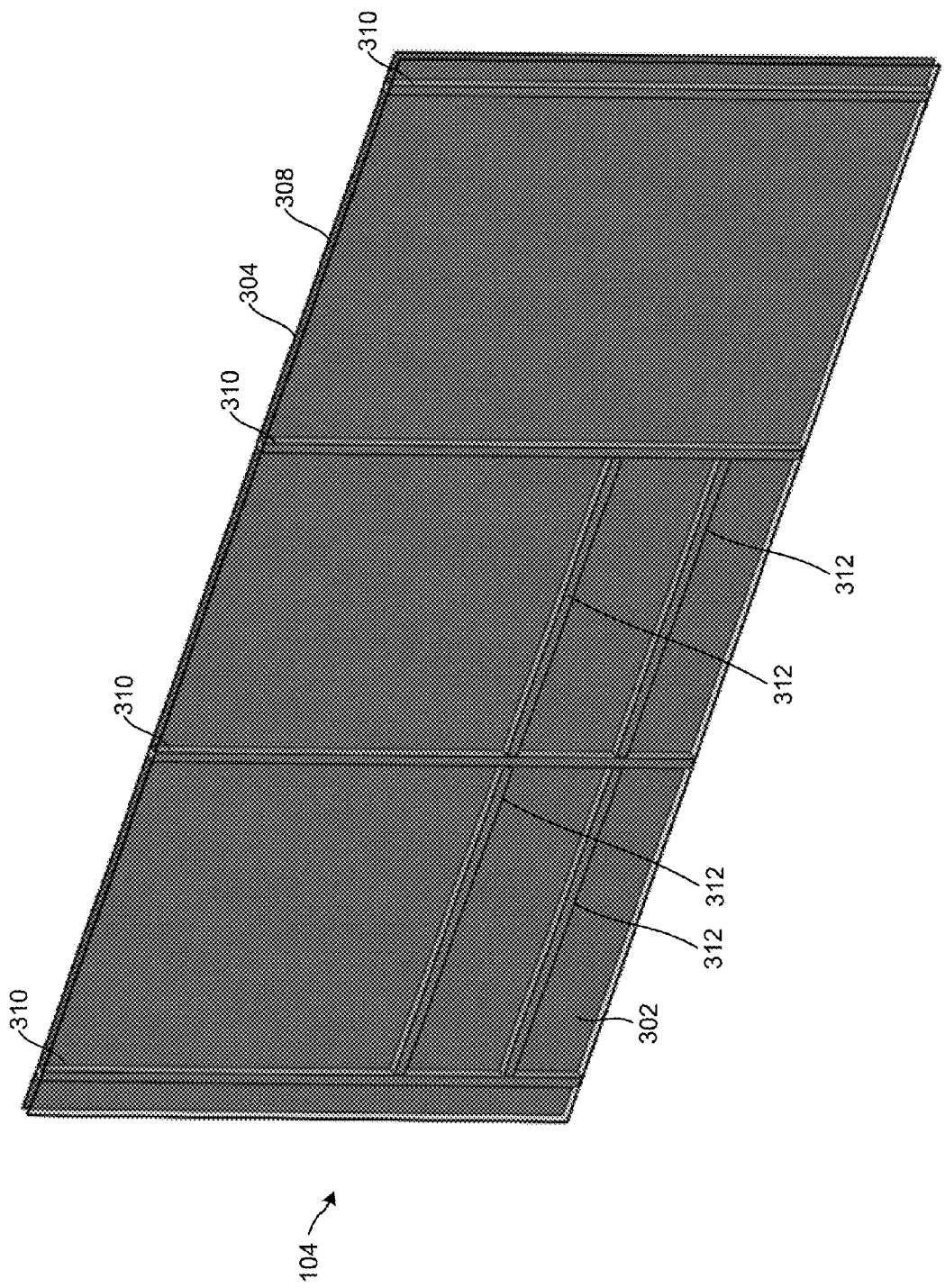

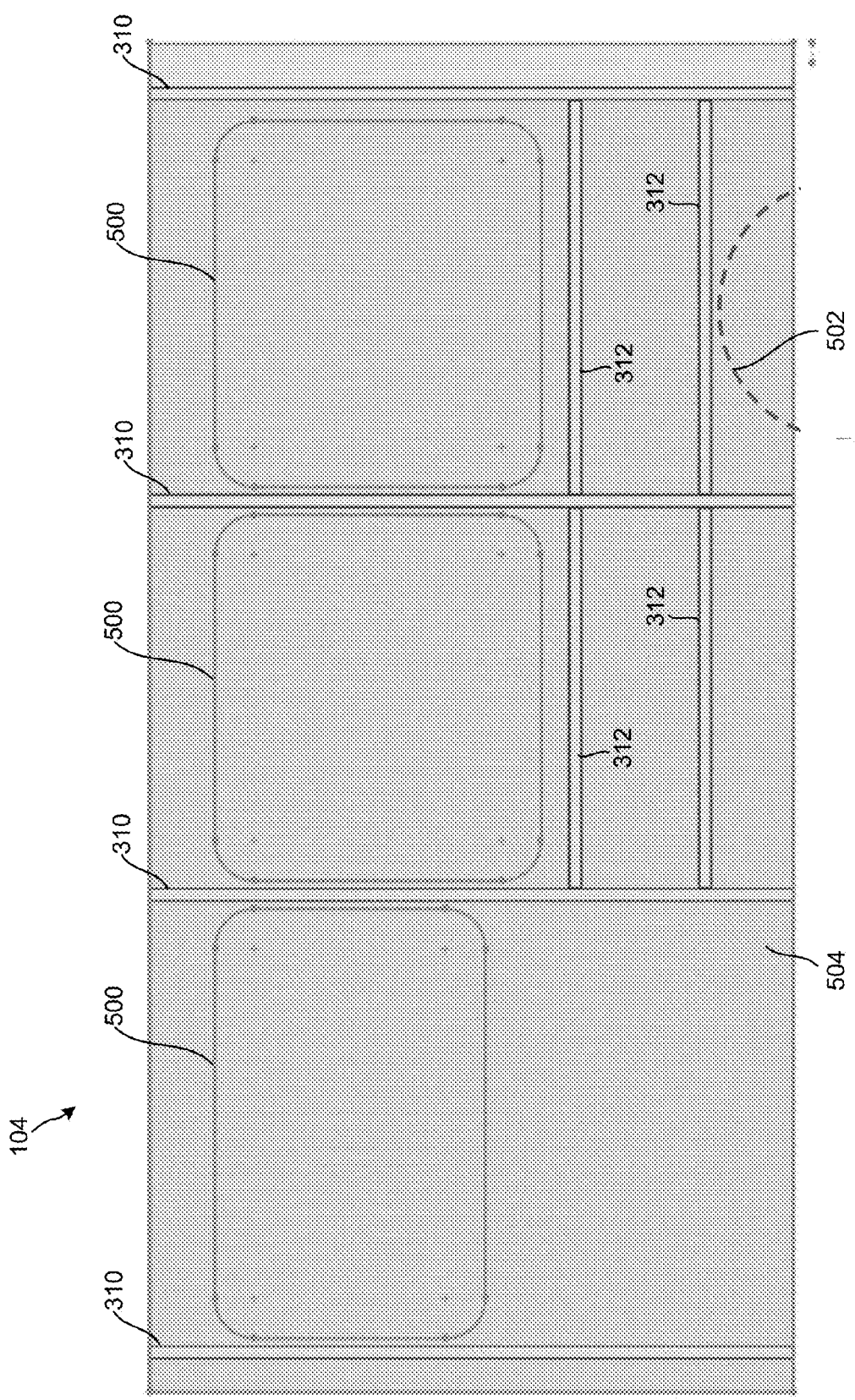

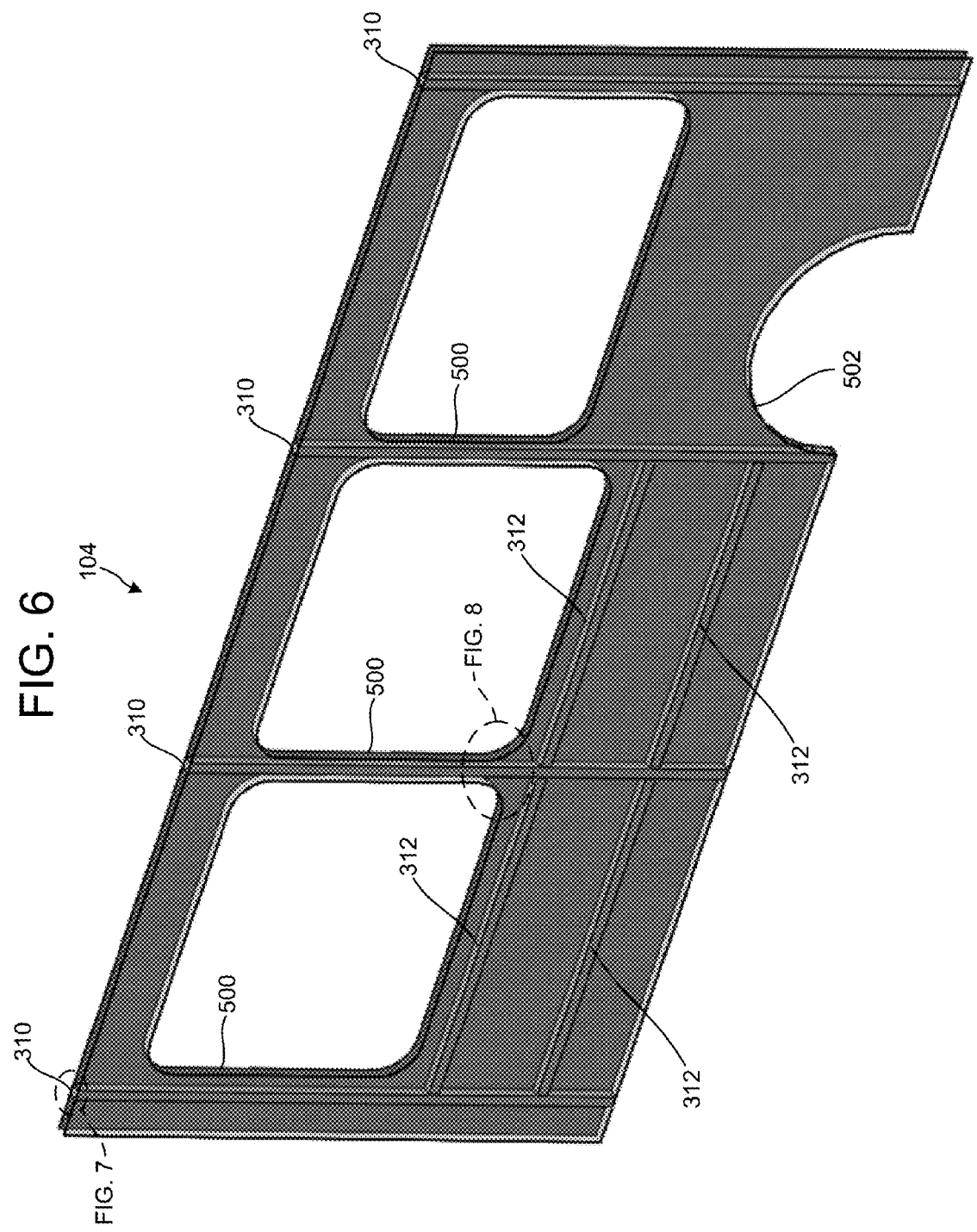

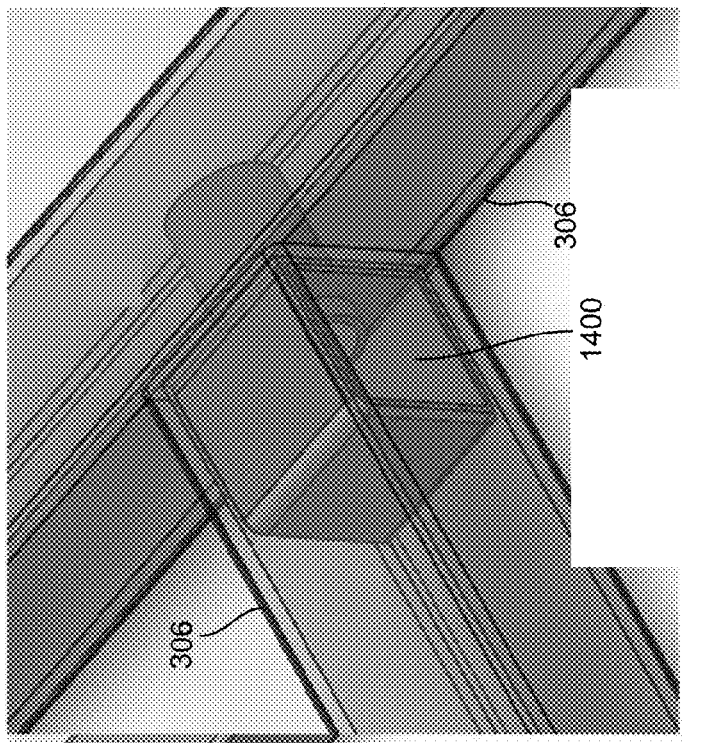
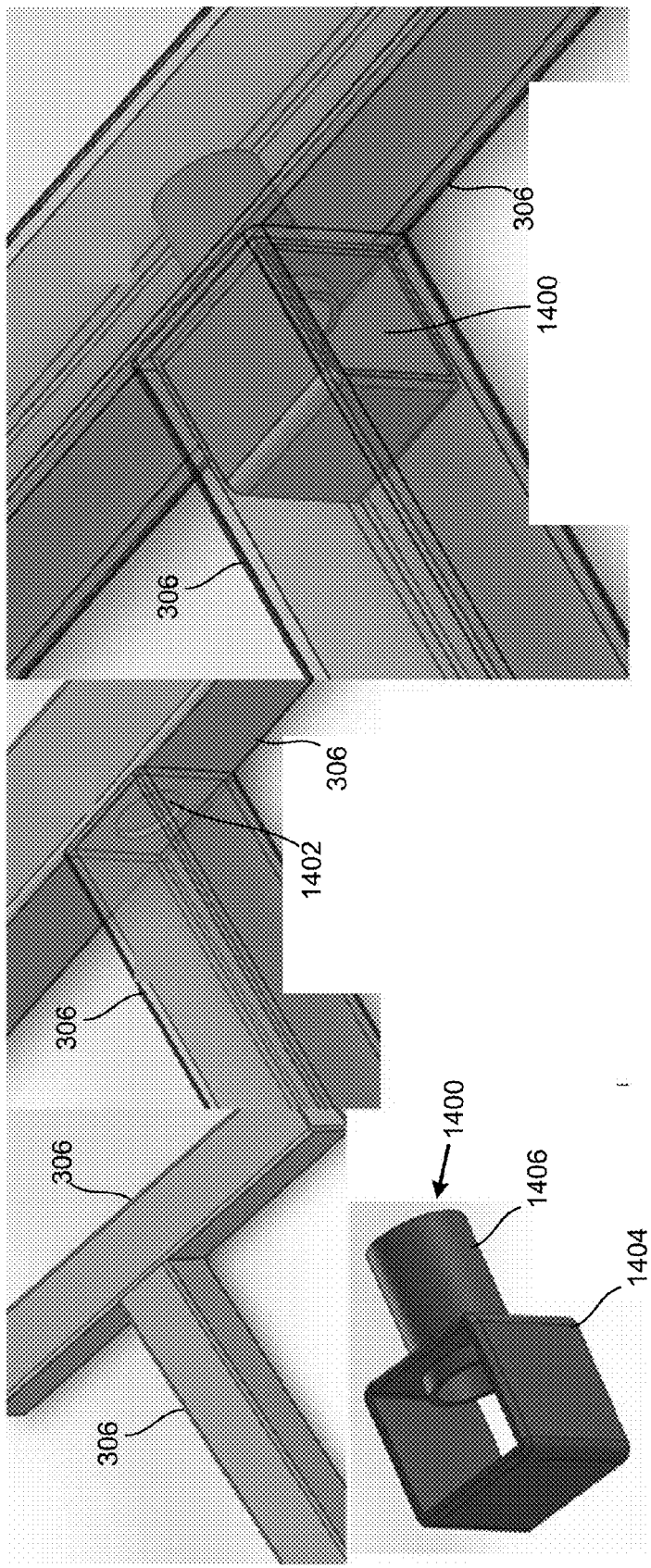
FIG. 14A  FIG. 14B  FIG. 14C  FIG. 14D

FIG. 16D
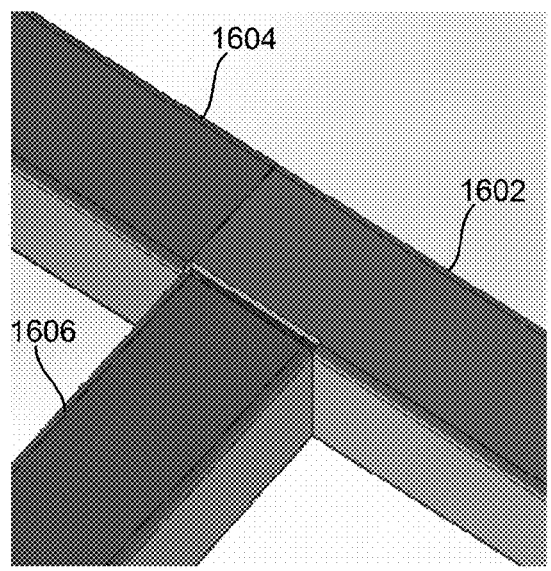
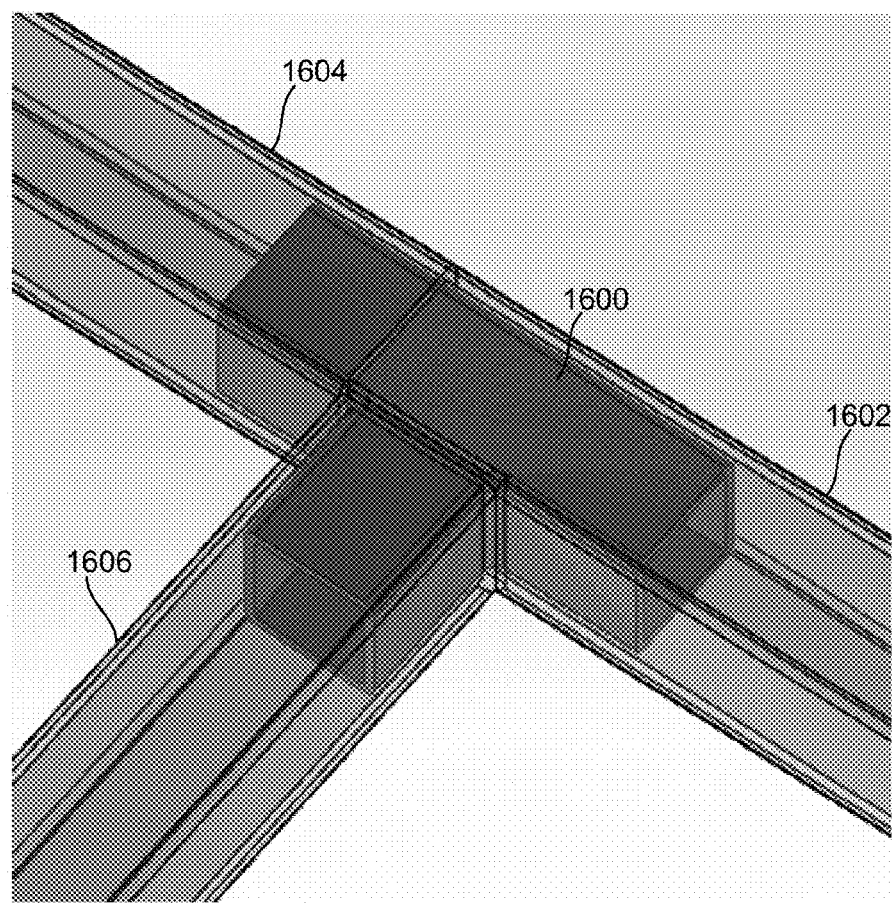
FIG. 16E

MODULAR VEHICLE

FIELD

The present disclosure generally relates to vehicles, and more particularly to an improved modular vehicle and methods of assembly thereof.

BACKGROUND

Typically, multi-passenger buses and other vehicles are constructed of a chassis onto which a frame, often made of metal such as steel, is built. Attached onto the frame are exterior panels, which are often aluminum or fiberglass. Interior panels are attached to the frame to form the interior of the vehicle.

Multi-passenger vehicles, since they carry passengers that often do not wear restraints such as seatbelts, are subject to rigorous safety and crash test standards. However, since the frame is rigid and the panels are made of malleable, brittle materials, a crash or rollover of the vehicle results in the panels and frame deforming and/or breaking, causing serious injury to passengers. This results in a limited residual space (i.e., a survival zone for passengers) within the passenger compartment of the bus or vehicle.

Reinforcement measures have been implemented to increase the structural integrity of present frames and panels. For example, steel plates or other heavy, durable materials are appended to the frame and/or panels to increase their structural integrity.

Moreover, sandwich type panel constructions have also been used, such as to build recreational vehicles. These include a sandwich panel core material such as polystyrene, paper, metal honeycomb, foamed polyurethane, plywood, or fibrous boards. A sandwich panel facing material (such as steel, aluminum, plywood, hardboard, or fiberglass-reinforced plastic) is then bonded to the core materials and any reinforcing member. Another sandwich panel facing material may also be bonded to the core materials on the opposite side as the sandwich panel facing material. A support member can then be secured using a fastener to an outside of the sandwich panel at the reinforcing member.

However, these reinforcement techniques (i.e., steel plates and sandwich type panels) cause the multi-passenger vehicles to become excessively heavy, creating issues regarding Gross Vehicle Weight. Moreover, known sandwich type panels often insufficiently provide structural support to the vehicle, thereby still resulting in deformation and breakage upon impact during a crash, roll-over, etc.

SUMMARY

In general, the present disclosure relates to an improved modular vehicle, such as a paratransit passenger bus, optimally configured to satisfy weight and strength considerations, and methods for assembling the modular vehicle. A passenger compartment of the modular vehicle, such as a bus, includes a roof panel and sandwich-type side panels coupled to structural joiners to form the passenger compartment. The side panels and the joiners may include pultruded beams for increased structural integrity. A chassis of the vehicle has channels integrated therein for coupling of the side panels and passenger compartment to the chassis. This coupling to the chassis channel may also include the use of a bonding agent.

The modular vehicle, according to the disclosure, has an increased residual space. Gross vehicle weight is reduced over steel frame vehicle structures, while structural integrity is improved.

BRIEF DESCRIPTION OF THE DRAWINGS

Embodiments of devices, systems, and methods are illustrated in the figures of the accompanying drawings which are meant to be exemplary and not limiting, in which like references are intended to refer to like or corresponding parts, and in which:

FIG. 2D illustrates a perspective view of an embodiment of the chassis coupled to the side panel according to embodiments of the disclosure;

FIG. 4 illustrates a perspective view of the side panel according to embodiments of the disclosure with structural pultrusions shown in phantom;

FIG. 5 illustrates a side view of the side panel incorporating cutting lines according to embodiments of the disclosure with structural pultrusions shown in phantom;

FIG. 6 illustrates a perspective view of the cut side panel according to embodiments of the disclosure with structural pultrusions shown in phantom;

FIG. 14A illustrates orthogonal pultrusions according to embodiments of the disclosure;

FIG. 14B illustrates orthogonal pultrusions with one of the pultrusions having a hole cut therethrough according to embodiments of the disclosure;

FIG. 14C illustrates an insert for coupling orthogonal pultrusions according to embodiments of the disclosure;

FIG. 14D illustrates orthogonal pultrusions coupled using the insert of FIG. 14C according to embodiments of the disclosure;

FIG. 16D illustrates pultrusions coupled using the tee-bracket of FIG. 16A according to embodiments of the disclosure;

FIG. 16E illustrates pultrusions coupled using the tee-bracket of FIG. 16A according to embodiments of the disclosure;

DETAILED DESCRIPTION

Figure 1A:
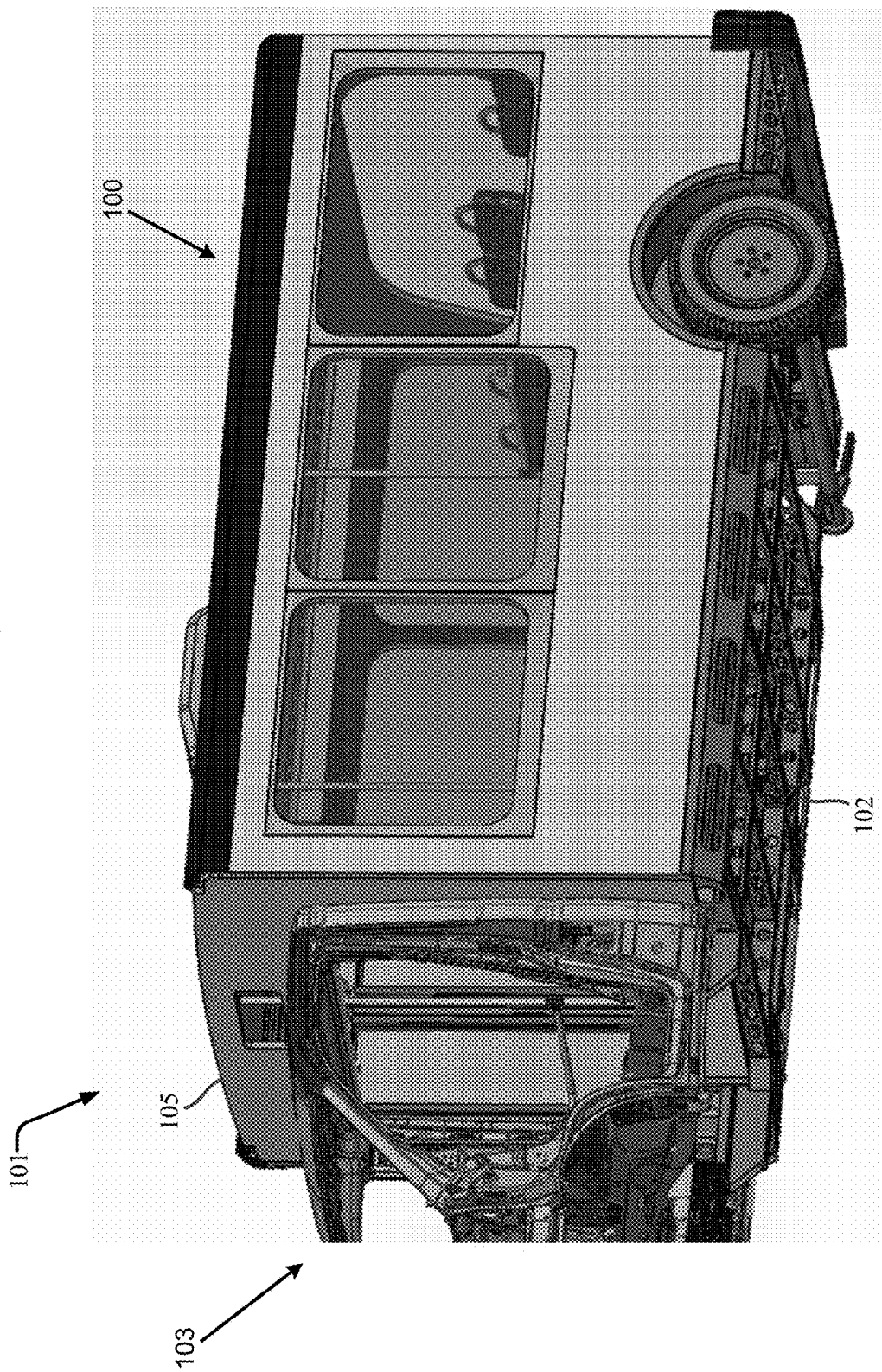
FIG. 1A illustrates a perspective view of a modular vehicle according to embodiments of the disclosure.
Figure 1B:
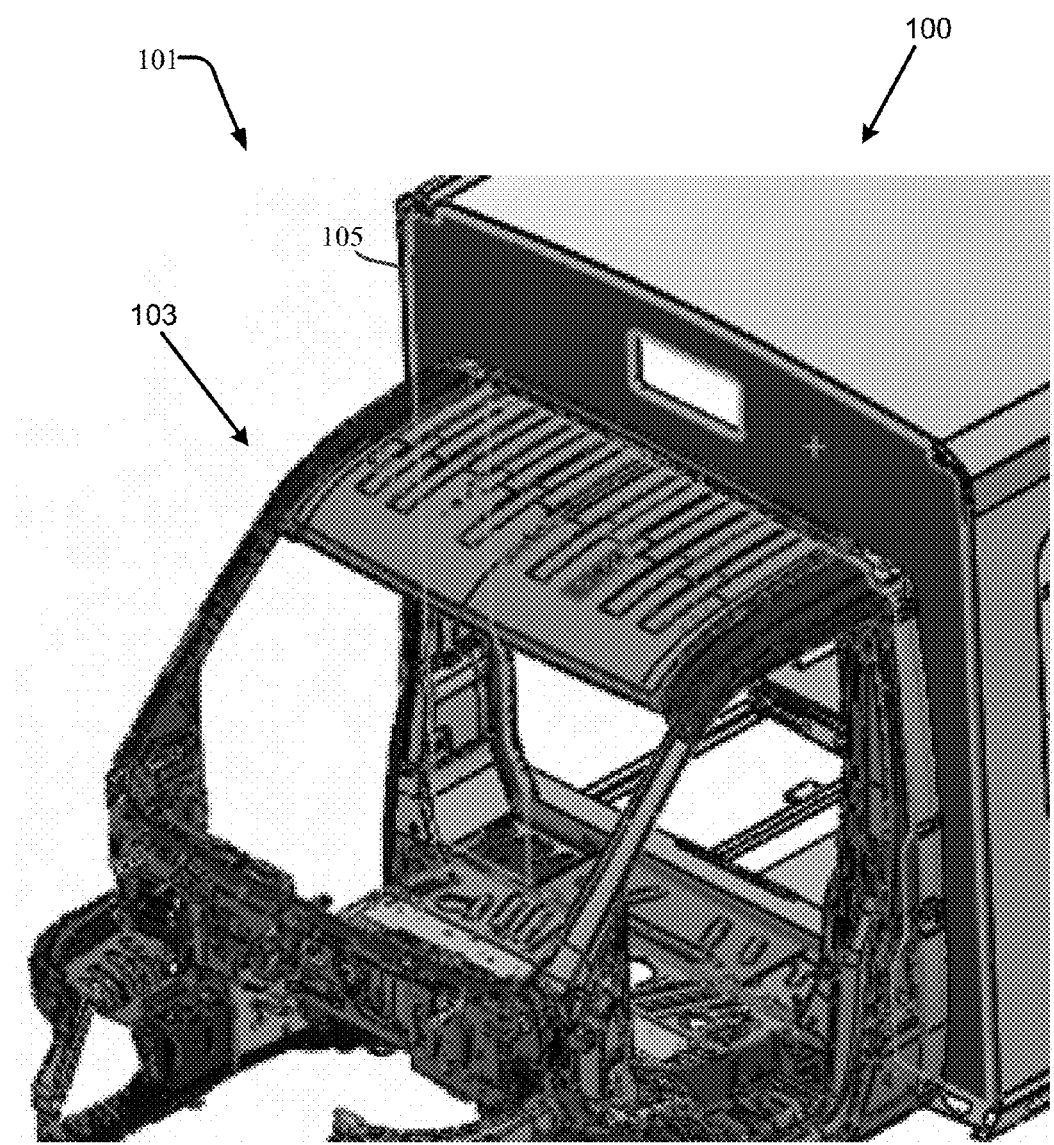
FIG. 1B illustrates a perspective view of components of the modular vehicle according to embodiments of the disclosure.
Figure 1C:
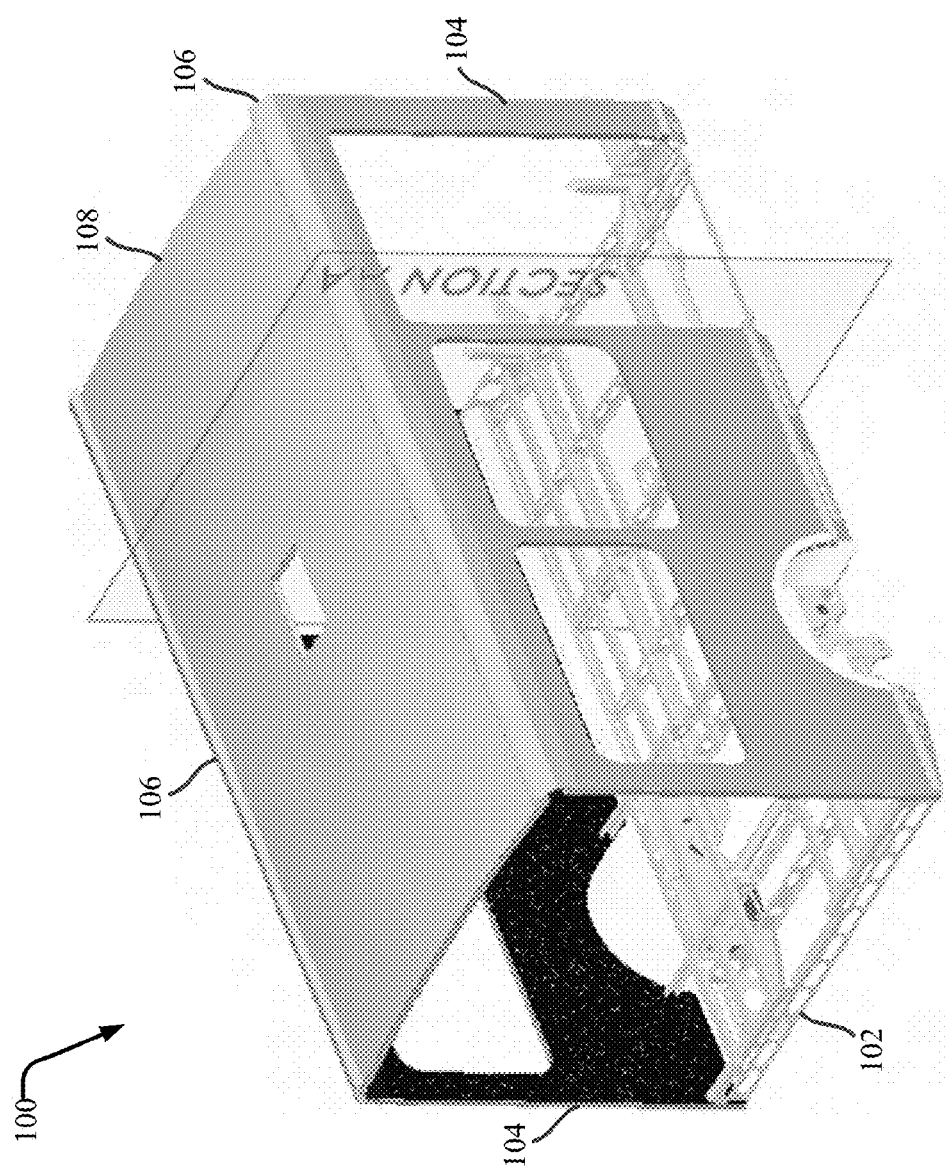
FIG. 1C illustrates a perspective view of a passenger compartment of the modular vehicle according to embodiments of the disclosure.
Figure 1D:
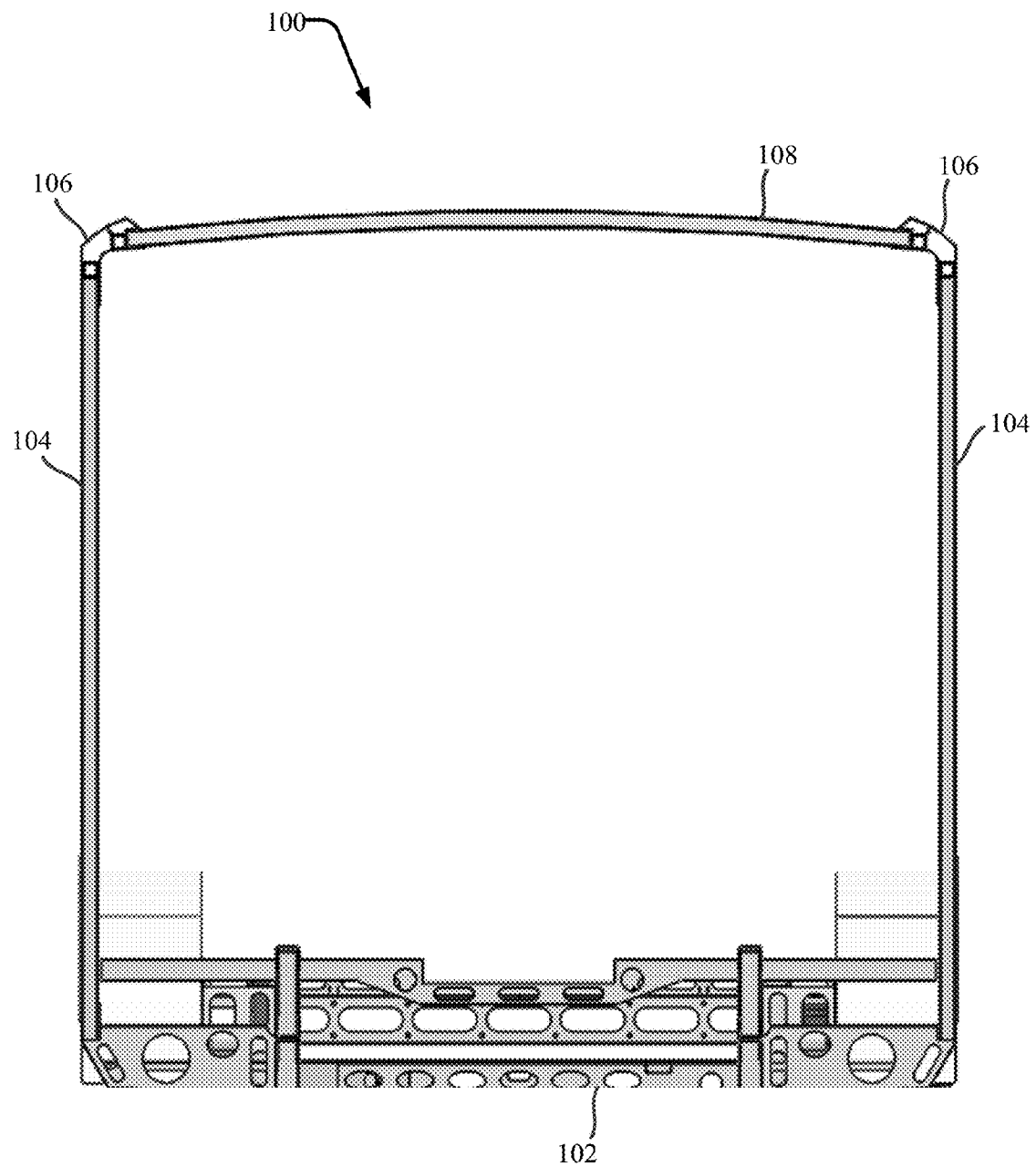
FIG. 1D illustrates a cross-section view of the passenger compartment of the modular vehicle according to embodiments of the disclosure, taken along the line AA of FIG. 1C.

Detailed embodiments of devices, systems, and methods are disclosed herein, however, it is to be understood that the disclosed embodiments are merely exemplary of the devices, systems, and methods, which may be embodied in various forms. Therefore, specific functional details disclosed herein are not to be interpreted as limiting, but merely as a basis for the claims and as a representative basis for teaching one skilled in the art to variously employ the present disclosure.

In general, the present disclosure provides an improved modular vehicle and methods for assembling the modular vehicle. The modular vehicle is optimally configured to satisfy weight and strength considerations. A passenger compartment of the modular vehicle includes a roof panel and sandwich-type side panels coupled to joiners using a bonding agent, such as resin. Both side panels and the joiners include pultruded beams for increased structural integrity. A chassis of the vehicle has channels integrated therein for coupling of the panels to the chassis using a bonding agent, for example. As a result, the modular vehicle has an increased residual space.

Referring to FIGS. 1A through 1D, a modular vehicle 101 having a modular passenger compartment 100 according to the present disclosure is described. The modular vehicle 101 includes a driver compartment 103 coupled to the passenger compartment 100 and/or a chassis 102 using a fastener such as an adhesive, resin, epoxy, or the like. The driver compartment 103 may be bonded to a front panel 105 of the passenger compartment 100.

The passenger compartment 100, which couples to a portion of the chassis 102, is formed of two sandwich-type side panels 104 that are each coupled at or proximate an edge of the chassis 102, joiners 106 that are each coupled to an edge of a side panel 104, and a roof panel 108 coupled to the joiners 106. As illustrated (best illustrated in the perspective view of FIG. 1C), each joiner 106 spans the length (front to back) of the passenger compartment 100. However, one skilled in the art should appreciate the joiners 106 could be configured having lengths not commensurate in scope with lengths of the passenger compartment 100. For example, each joiner 106 may have a length shorter than that of the passenger compartment 100, thereby resulting in more than one joiner 106 being used on each side of the passenger compartment 100 in order to cover the length of the passenger compartment 100. In this alternative construction, a seal would be introduced between each section of joiner 106.

FIGS. 1D, 2A through 2C illustrate the chassis 102 coupled to the side panel(s) 104. The chassis 102 includes a channel(s) 200, such as a U channel, for example. The channel 200 is formed by a first side 203, a bottom portion 205, and a second side 207. The channel 200 may or may not have a length commensurate with the length of the chassis 102 and/or side panel 104 but in most implementations that may be desirable. The side panel 104 is coupled to the channel 200 of the chassis 102. Such coupling may include the use of a bonding agent, such as resin, epoxy, or the like. For example, the side panel 104 may be coupled to the chassis 102 (i.e., the first side 203, the bottom portion 205, and/or the second side 207) using a one (1) component polyurethane adhesive, such as Sikaflex® 252 or 255, offered by Sika Corporation of Lyndhurst, N.J. Neither, one, or both of the sides 203, 207 may have one or more angled edges 202 that provide structural integrity to the channel 200 and/or provide a guide mechanism to help guide the edges of the side panels 104 into the channel 200 during assembly of the compartment to the chassis 102. The angled edges 202 may also provide increased surface area for bonding of the side panels 104 to the channel 200. Although not shown, it should be appreciated that edges of the side panel may have mechanical structures such as bumps or detents to mate with corresponding mechanical features formed in the chassis channel in order to provide a friction fit and supplement a bonding agent in attaching the compartment/side panels to the chassis.

FIG. 2D illustrates a specific embodiment for coupling the side panel 104 to the chassis 102. According to this embodiment, the channel 200 is formed by two portions (i.e., the bottom portion 205 and the first side 203). The first side 203 may be an interior side of the channel 200. That is, the first side 203 may abut a surface of the side panel 104 that faces an interior of a fully constructed modular vehicle as described herein. The side panel 104 may be coupled to the bottom portion 205 and/or the first side 203 using a bonding agent, such as resin, epoxy, or the like.

Figure 2A:
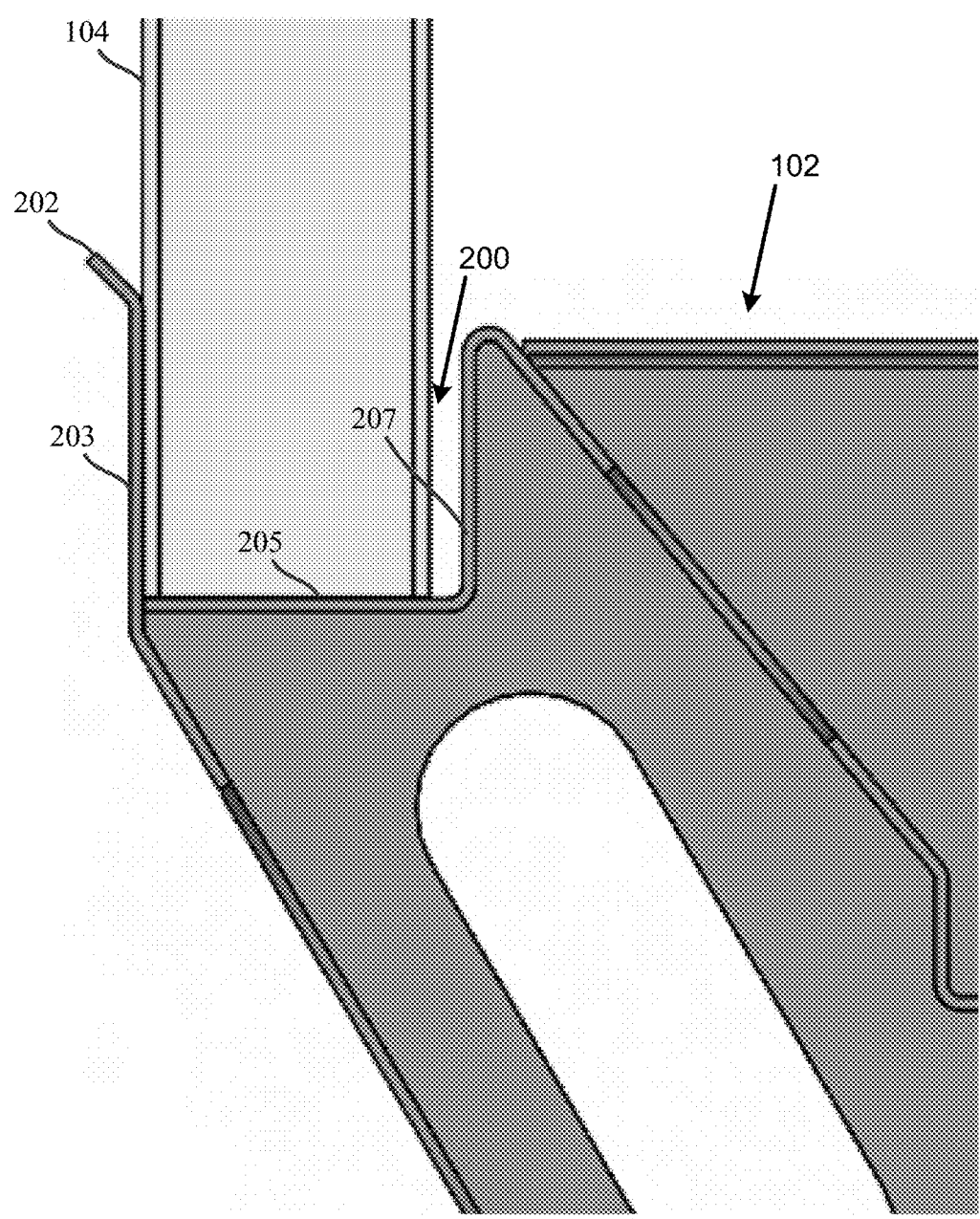
FIG. 2A illustrates an exploded view of a chassis coupled to a side panel according to embodiments of the disclosure.
Figure 2B:
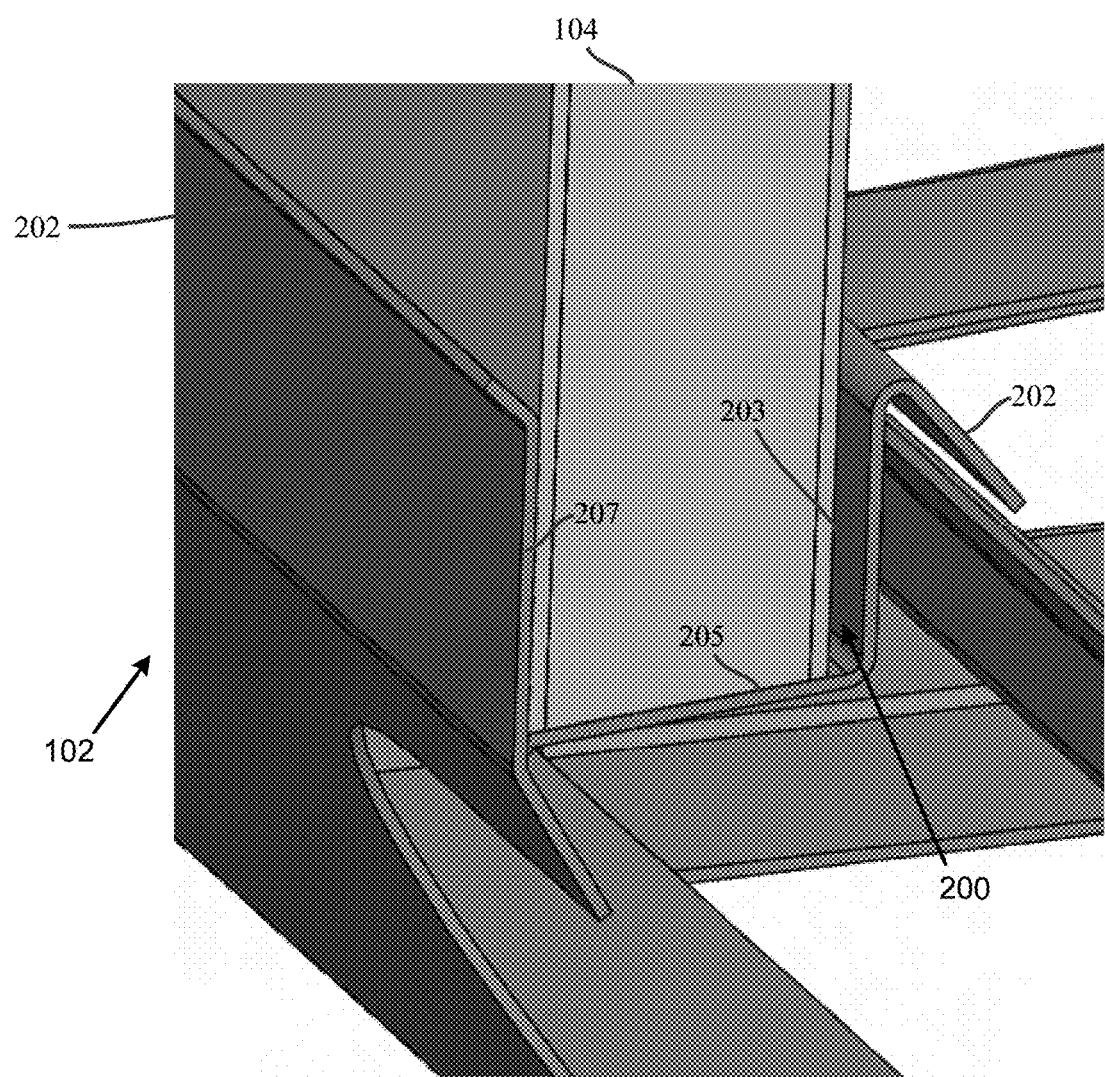
FIG. 2B illustrates the chassis coupled to the side panel according to embodiments of the disclosure.
Figure 2C:
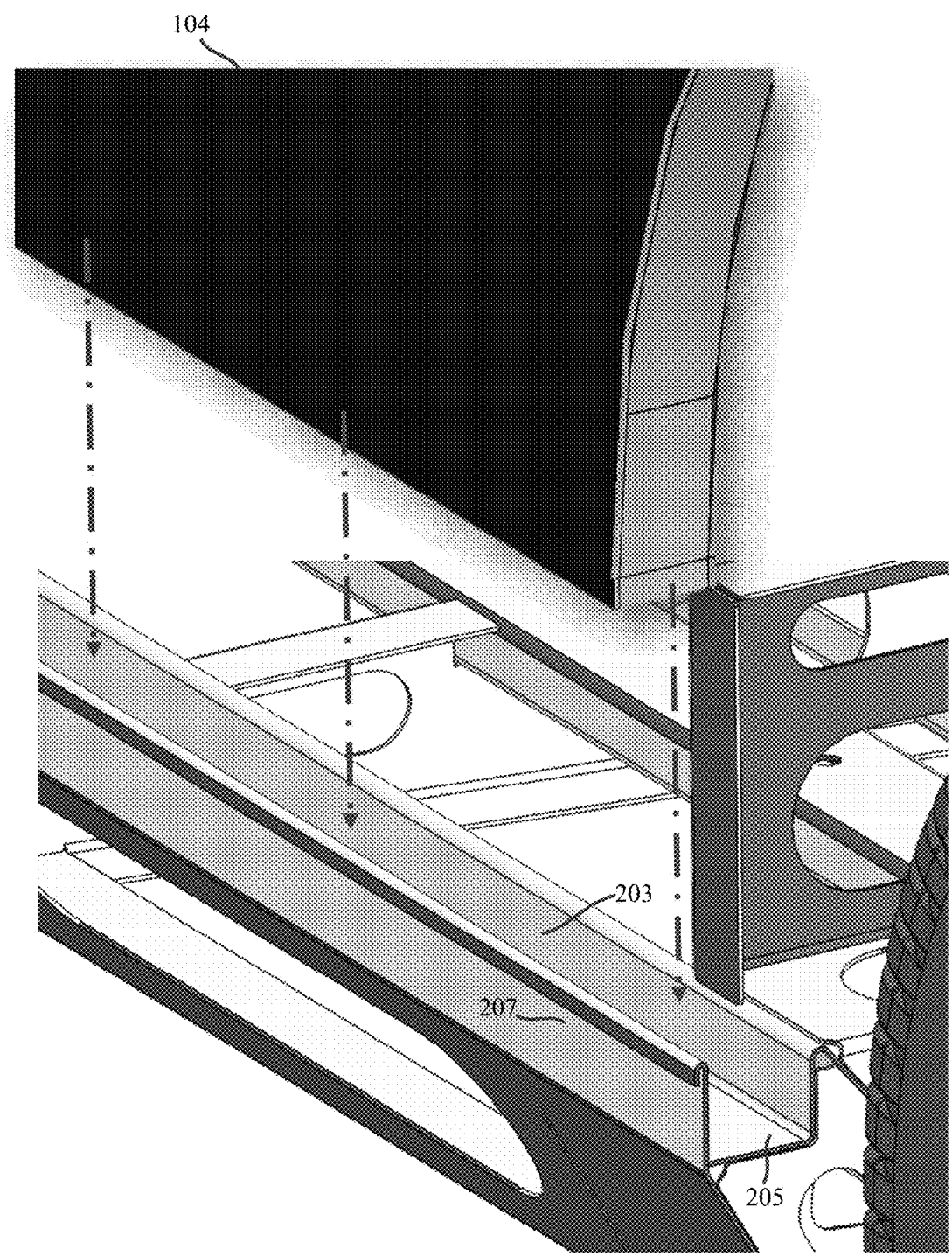
FIG. 2C illustrates the chassis decoupled from the side panel according to embodiments of the disclosure.
Figure 2E:
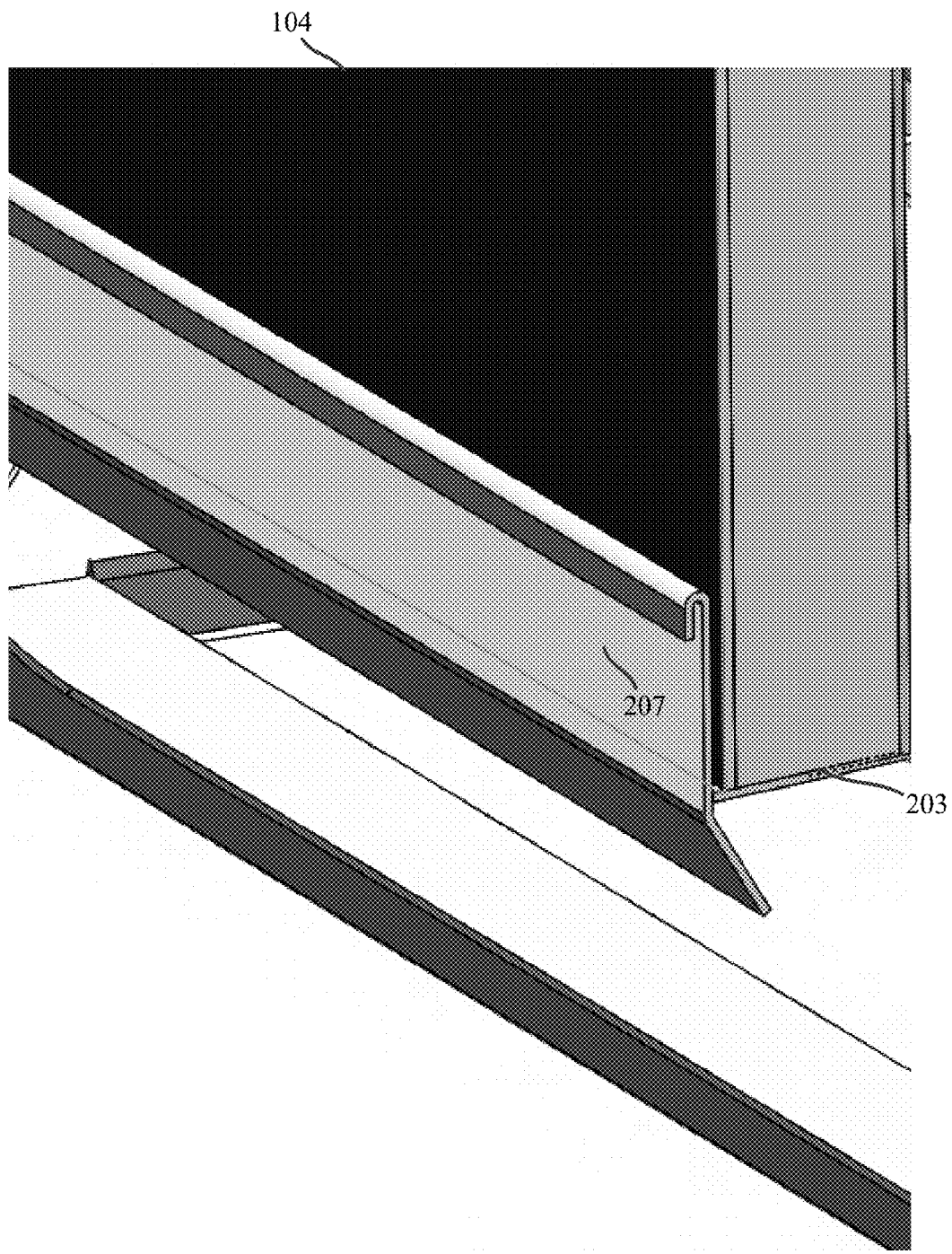
FIG. 2E illustrates a perspective view of another embodiment of the chassis coupled to the side panel according to embodiments of the disclosure.

FIG. 2E illustrates another specific embodiment for coupling the side panel 104 to the chassis 102. According to this embodiment, the channel 200 is formed by two portions (i.e., the bottom portion 205 and the second side 207). The second side 203 may be an exterior side of the channel 200. That is, the second side 207 may abut a surface of the side panel 104 that forms an outer surface of a fully constructed modular vehicle as described herein. The side panel 104 may be coupled to the bottom portion 205 and/or the second side 207 using a bonding agent, such as resin, epoxy, or the like.

Figure 3:
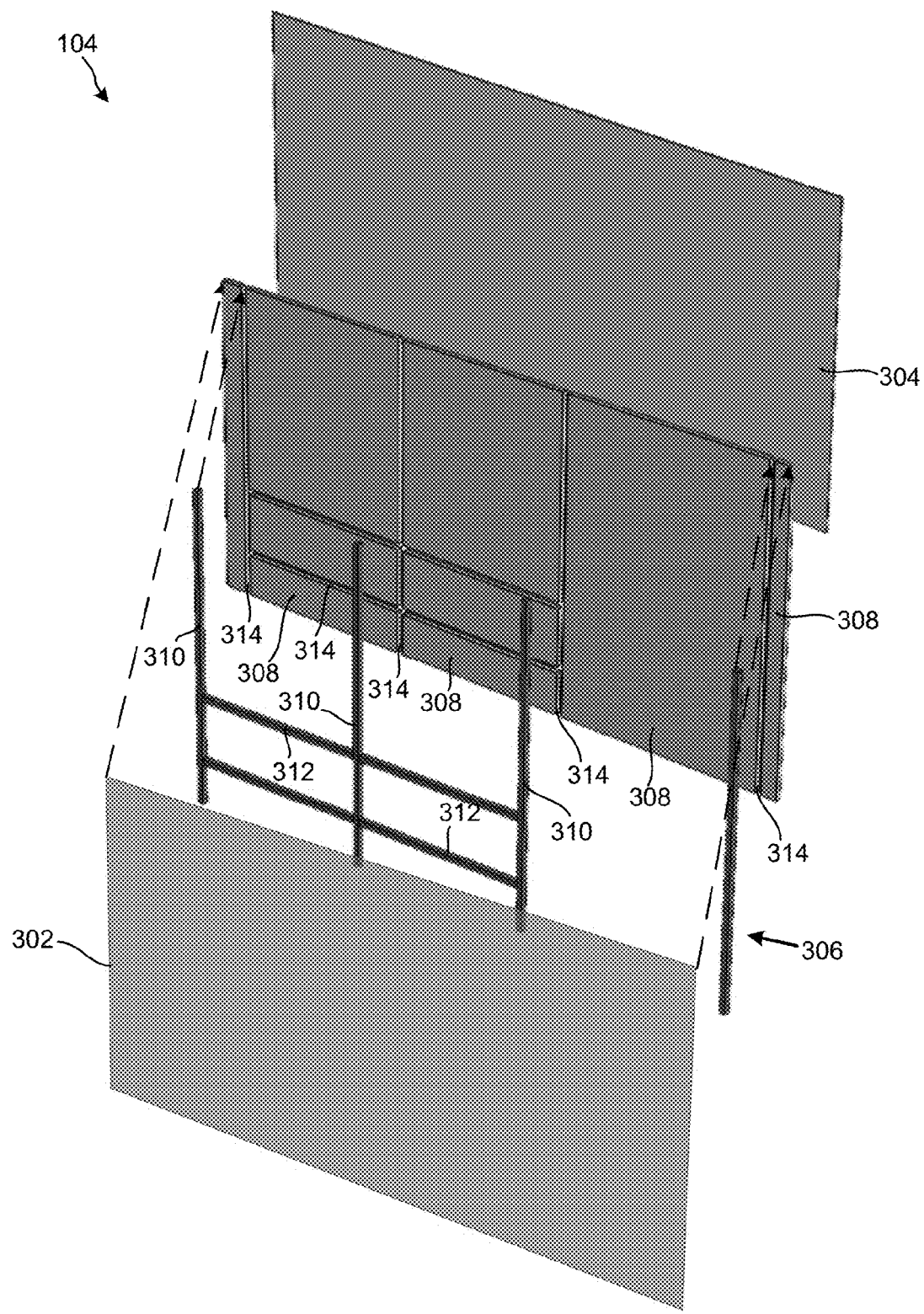
FIG. 3 illustrates an exploded view of the side panel according to embodiments of the disclosure.

Referring now to FIGS. 3 and 4, a side panel 104 according to the present disclosure is described. Side panels may be configured and constructed as described in detail in commonly owned, co-pending U.S. patent application Ser. No. 14/739,569 filed Jun. 15, 2015, which is incorporated herein by reference in its entirety, filed by the same inventors as the present application. The panel 104 includes a first outer sheet 302, a second outer sheet 304, one or more pultruded box beams or "pultrusions" 306 disposed between the first outer sheet 302 and the second outer sheet 304, and one or more core material portions 308 disposed between the first outer sheet 302 and the second outer sheet 304. In an example, the panel 104 may be a modular panel configured for use in a paratransit passenger bus. Accordingly, the panel 104 may be about 169 inches by about 81 inches, for example.

The first and second outer sheets 302, 304 may be monolithically formed as single pieces, and act as a type of skin of the panel 104. For example, the first and second outer sheets 302, 304 may be fiber reinforced plastic or fiber reinforced polymer (FRP). The outer sheets 302, 304 may also be coated, embossed, laminated, or otherwise provide decorative appeal to the panel 104.

The one or more pultruded box beams 306 may be disposed in selected locations between the first and second outer sheets 302, 304 to provide necessary weight, strength, and structural aspects to the panel 104. As illustrated, the panel 104 is designed to be used as a side panel for a modular vehicle, such as a bus or paratransit bus, so the pultruded box beams 306 are optimally sized for strength and structural weight considerations. For example the pultrusions 306 could be square or rectangular, or the like, and dimensioned to be from about 1 to 3 inches by about 1 to 3 inches formed as square or rectangular beams to provide desired strength and weight characteristics for the illustrative paratransit bus side panel implementation. In an illustrative embodiment, the pultrusions 306 may be 1.5 inch by 1.5 inch square beams. In this example, the one or more box beams 306 include four substantially vertical portions 310 and two substantially horizontal portions 312. The four substantially vertical portions 310 are spaced apart from one another along a horizontal length of the panel 104 at a distance in a range of approximately 30 to 55 inches, or otherwise spaced for window placement and to maintain structural integrity.

Similarly, the two horizontal sections 312 of the pultruded box beams 306 are optimally sized for strength and structural weight considerations. The horizontal pultrusions 312 are positioned below a center line of the panel 104 at a distance between each pultrusion in a range of approximately 30 to 55 inches. This allows for windows and other features of a side of the modular vehicle to be formed utilizing the load carrying characteristics of the integrated frame and side panel 104 without the weight and complexity of welded metal framing.

The core material 308 may fill the space between the first and second outer sheets 302, 304, as well as between the various pultruded box beams 306. The core material 308 may be a foam, or other lightweight, durable material, such as high-density and closed-cell foam. In an example, when the core material 308 is a solid type material, the core material 308 may include one or more portions disposed between the horizontal and vertically disposed pultruded box beams 306. In another example, when the core material 308 is a solid type material, the core material 308 may include recesses or channels 314 formed therein, in which case the box beams 306 are disposed in the channels 314.

In one example, the side panel 104 may be formed by coupling the first outer sheet 302 to a first side of the box beams 306 and coupling the second outer sheet 304 to a second side, opposite the first side, of the box beams 306. The core material 308 may then be injected between the first and second outer sheets 302, 304 and the box beams 306. In another example, the panel 104 may be formed by positioning the box beams 306 in channels 314 and coupling the box beams 306 to the core material 308. The first outer sheet 302 is then coupled to a first side of the box beams 306 and core material 308 and the second outer sheet 304 is then coupled to a second side, opposite the first side, of the box beams 306 and core material 308.

In yet another example, the panel 104 may be formed by positioning the box beams 306 between sheets or portions of the core material 308 and coupling the box beams 306 to the core material 308. The first outer sheet 302 is then coupled to a first side of the box beams 306 and core material 308 and the second outer sheet 304 is then coupled to a second side, opposite the first side, of the box beams 306 and core material 308, as described in greater detail hereinafter.

The various elements (the first outer sheet 302, the second outer sheet 304, the box beams 306, and the core material 308) may be coupled together via bonding to construct a side 104 panel with an integrated structural frame. This may include bonding using one or more bonding agents, such as, adhesives, resins, etc.

As mentioned above, the panel 104 is designed to be used as a lightweight structural side panel with an integrated frame for a modular vehicle, such as a bus or paratransit bus. For example, in FIG. 5, a paratransit bus side panel 104 with an integrated structural frame is illustrated having outlines for one or more windows 500 and a wheel well 502 to be cut out after the modular side panel 104 is assembled as described hereinafter. The one or more windows 500, wheel well 502, and a perimeter 504 of the side panel 104 may then be cut, resulting in the side panel 104 illustrated in FIG. 6 having a fully integrated structural frame comprised of vertical and horizontal box beam pultrusions 310, 312 as described herein before. In this example, the windows 500 are located between the four vertically oriented box beams 310 and vertically above the horizontally positioned box beams 312. This allows the side panel 104 of the vehicle to be constructed as a modular panel with integrated structural components without compromising the structure of the vehicle. However, it should be appreciated, that box beams 306 may be oriented in any of various directions and spacings to accommodate other features of a side panel 104 of a vehicle or modular application to be formed with fully integrated structural components comprising the box beams 310, 312.

Figure 8:
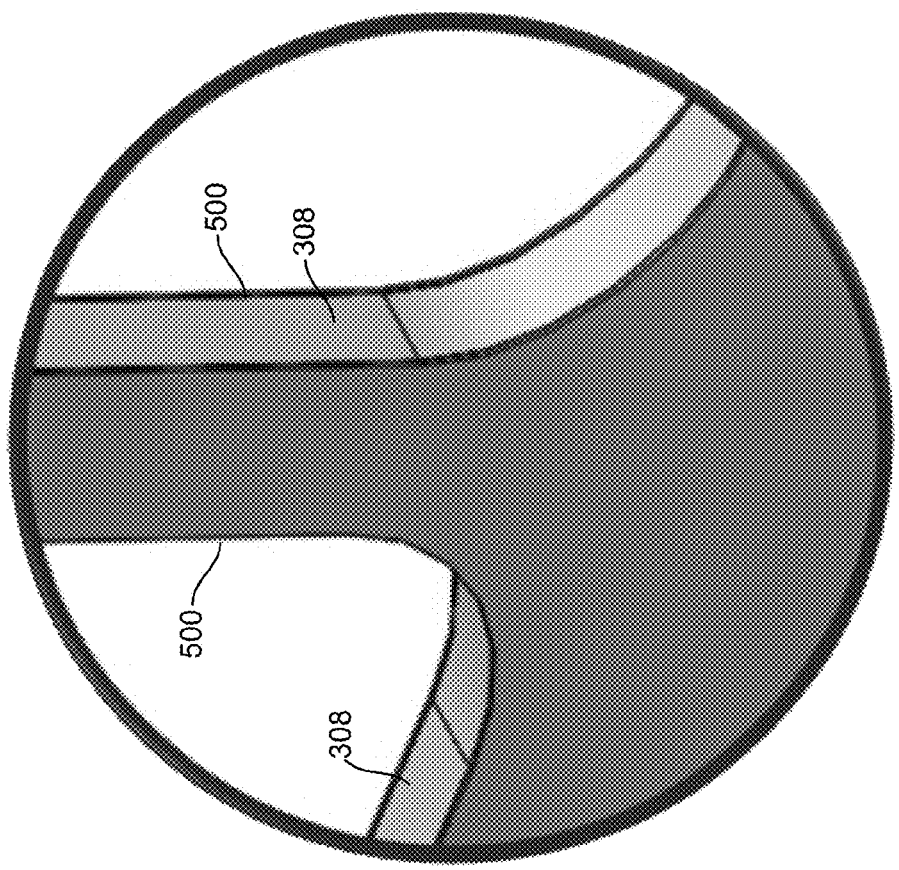
FIG. 8 illustrates an enlarged view of a second portion of the cut side panel of FIG. 6 according to embodiments of the disclosure.
Figure 7:
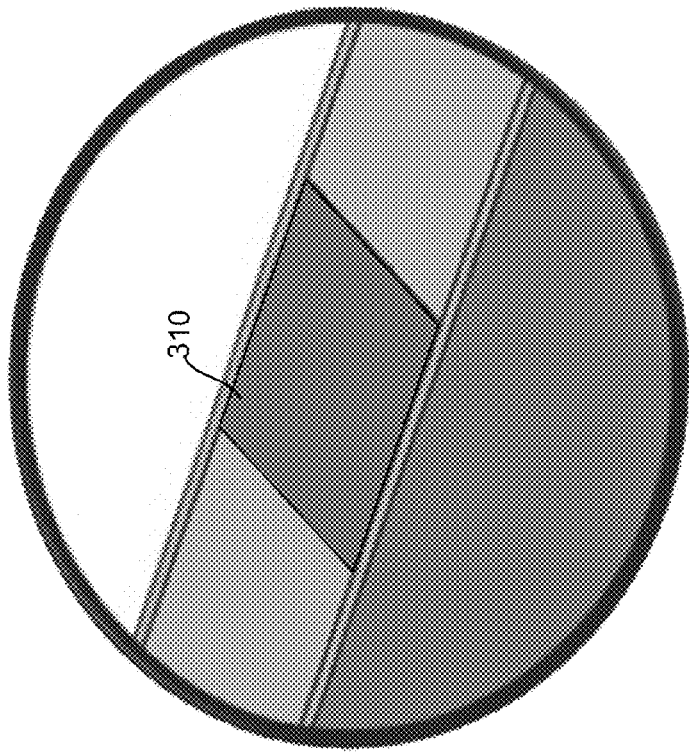
FIG. 7 illustrates an enlarged view of a first portion of the cut side panel of FIG. 6 according to embodiments of the disclosure.

Referring to FIGS. 7 and 8, the box beams 306 provide for increased strength as well as a lighter side wall of a vehicle than that of any conventional vehicle side wall construction. As illustrated in FIG. 8, the modular side panel 104 also allows for a greater radius in the windows 500 than that of conventional vehicle side wall construction. This greater radius in the window 500 provides increased strength at window connections.

Figure 9:
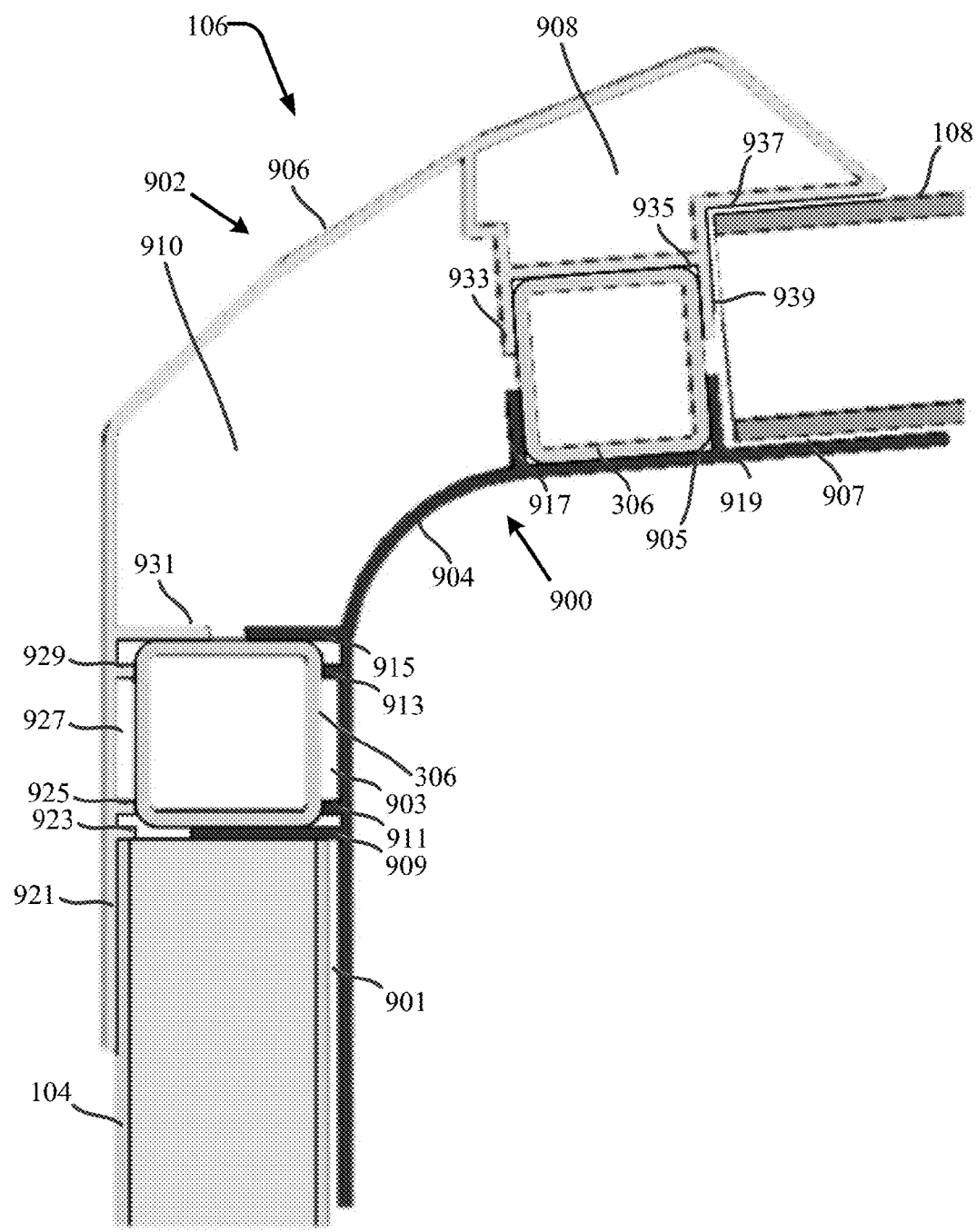
FIG. 9 illustrates a cross-section view of a joiner coupled to the side panel of FIGS. 3 through 8 and a roof panel according to embodiments of the disclosure

Referring now to FIG. 9, the joiner 106 for connecting a roof panel and side panels to form a modular vehicle according to the present disclosure is described. The joiner may be configured and constructed as described in detail in commonly owned, co-pending U.S. patent application Ser. No. 14/806,730, filed Jul. 23, 2015, which is incorporated herein by reference in its entirety, filed by the same inventors as the present application. The joiner 106 includes an inner extrusion 900, an outer extrusion 902, and optionally one or more pultruded box beams 306. The inner and outer extrusions 900, 902 may be coated, embossed, laminated, or otherwise provide decorative appeal to the joiner 106.

The inner extrusion 900 is an arcuate structure having an arcuate or curved surface 904 that is convex with respect to an inner passenger compartment when implemented. Furthermore, one or more support channels 901, 903, 905, 907 are created along the curved surface 904 by walls 909, 911, 913, 915, 917, 919 that extend from the curved surface 904. For example, these walls 909, 911, 913, 915, 917, 919 may perpendicularly extend from the curved surface 904. Moreover, the curved surface 904 may have at least one substantially linear or planar surface from which the walls 909, 911, 913, 915, 917, 919 extend. One or more box beam channels 903, 905 may be created by the walls 909, 911, 913, 915, 917, 919 proximate to ends of the curved surface 904. Additionally, a side panel channel 901 is created proximate to or at an end of the curved surface 904 and a roof panel channel 907 is created proximate or at a different end of the curved surface 904. One or both of the sidewall panel and roof panel channels 901, 907 may be partially created by the curved surface 904 and partially created by a wall 909, 919 of a proximate box beam channel 903, 905.

The outer extrusion 902, like the inner extrusion 900, is also an arcuate structure having an arcuate or curved surface 906 that is convex with respect to an inner passenger compartment when implemented. As illustrated, the arcuate surface 906 of the outer extrusion 902 does not have a uniform curve (it contains one or more bends). However, one skilled in the art should appreciate that the arcuate surface 906 of the outer extrusion 902 may be substantially or perfectly arcuate without departing from the scope of the present disclosure. A rigid channel 908 may be defined within or proximate to an end of the outer extrusion 902, which allows for cables, lines, such as refrigerant lines, and the like to be passed through the joiner 106. Walls 923, 925, 929, 931, 933, 939 extend from the curved surface 906 and/or rigid channel 908 to create a side panel channel 921, roof panel channel 937, and one or more box beam channels 927, 935. These walls 923, 925, 929, 931, 933, 939 may perpendicularly extend from the curved surface 906 and/or rigid channel 908, for example. Each of the one or more box beam channels 927, 935 houses one or more box beams 306. At least one of the box beam channels 927, 935 may be created by walls 923, 925, 929, 931, 933, 939 proximate ends of the curved surface 906. The side panel channel 921 is created proximate to or at an end of the curved surface 906 and the roof panel channel 937 is created proximate to or at a different end of the curved surface 906. One or both of the side panel and roof panel channels 921, 937 may be partially created by the curved surface 906 and/or a wall 923, 939 of a proximate box beam channel 927, 935. A portion of the rigid channel 908 may be used to create either a portion of the side panel channel 921 or a portion of the roof panel channel 937, or the rigid channel 908 may not form a portion of either the side panel channel 921 or roof panel channel 937. Moreover, a portion of the rigid channel 908 may be used to partially create one or more of the box beam channels 927, 935.

An illustrative method for assembling the extrusions 900, 902 into the joiner 106 is described as follows. An adhesive may be applied to one or more box beam(s) 306 and/or box beam channels 903, 905 of the inner and the outer extrusions 900, 902. The box beam(s) 306 are placed within/coupled to the box beam channels 903, 905 of either the inner or outer extrusion 900, 902. The box beam channels of the extrusion (either inner or outer) not containing the box beams(s) 306 are coupled to the box beam(s) 306. Alternatively, the box beam channels of respective inner and outer extrusions 900, 902 may be coupled to the box beam(s) 308 simultaneously.

Furthermore, the box beams 306 within the joiner 106 may be used to pass cables, lines, and the like through the joiner 106. The one or more box beams 306 may be disposed in selected locations within the box beam channels 903, 905, 927, 935 of the inner and outer extrusions 900, 902 to provide necessary weight, strength, and structural integrity to the joiner 106. Thus, each box beam 306 may have a length substantially equal to or identical to the length of the structural joiner 106, resulting in a single box beam 306 being implemented within each box beam channel 903, 905, 927, 935. However, one skilled in the art should appreciate the box beams 306 having different lengths resulting in one or more box beams 306 being implemented within a single box beam channel 903, 905, 927, 935 of the joiner 106.

Unassembled, the box beam 903, 905, 927, 935, side panel 903, 905, 927, 935, and roof panel 907, 937 channels of the inner and outer extrusions 900, 902 each only partially house the box beam(s) 306, side panel 104, and roof panel 108. When assembled, these channels of the inner extrusion 900 correspond with respective channels of the outer extrusion 902 (i.e., 901-921, 903-927, 905-935, 907-937) to fully encapsulate or house the box beams(s) 306, portions of the side panel 104, and portions of the roof panel 108. All or some of the channels (that is the box beam 903, 905, 927, 935, side panel 901, 921, roof panel 907, 937, and rigid 908 channels) may run parallel or substantially parallel to each other along their respective extrusion 900, 902.

As illustrated, the joiner 106 is constructed of two separate and distinct extrusions 900, 902. However, one skilled in the art should appreciate the joiner 106 being constructed of a single unitary structure that resembles the two extrusions 900, 902 coupled together. Regardless of the construction methodology used, a channel 910 is formed between the two arcuate surfaces 904, 906. This channel 910 may be used to pass materials through the joiner 106, such as cables, refrigerant lines, and the like, for example.

Coupling of the inner and outer extrusions 900, 902, when not a single unitary structure, may include ensuring respective channels of the extrusions 900, 902 (such as box beam-box beam 903, 905, 927, 935, side panel-side panel 901, 921, roof panel-roof panel 907, 937, etc.) substantially or perfectly correspond to or line up with each other. Moreover, coupling of the extrusions 900, 902 may include the use of an adhesive, epoxy, resin, or like light weight, durable bonding material. For example, a structural adhesive, such as Sikaflex® 3131s or 3121s offered by Sika Corporation of Lyndhurst, N.J., a methyl methacrylate adhesive, or a two (2) component adhesive may be used to adjoin portions of the inner and outer extrusions 900, 902 to the roof panel 108 and the box beam(s) 306 interspersed between the inner and outer extrusions 900, 902 and proximate to the roof panel 108. For further example, a structural adhesive, such as Sikaflex® 3131s or 3121s offered by Sika Corporation of Lyndhurst, N.J., a methyl methacrylate adhesive, or a two (2) component adhesive may be used to adjoin portions of the inner and outer extrusions 900, 902 to the side panel 104. Moreover, a structural adhesive, such as Sikaflex® 3131s or 3121s offered by Sika Corporation of Lyndhurst, N.J., a methyl methacrylate adhesive, or a two (2) component adhesive may be used to adjoin the box beam(s) 306 (which are proximate to the side panel 104) to surfaces 909, 911, 913, 915, 925, 929, and 931 of the inner and outer extrusions 900, 902. Yet further, a single component polyurethane adhesive, such as Sikaflex® 252 or 255, offered by Sika Corporation of Lyndhurst, N.J., may be used to bond the box beam(s) 306 (which are proximate to the side panel 104) to surfaces of the inner and outer extrusions 900, 902 that form part of the channels 903, 927.

Core material may be disposed within the channels created by and within the inner and outer extrusions 900, 902. The core material may impart further structural integrity to the joiner 106. For example, the core material may be disposed in the channels 903, 905, 927, 935 that house the box beams 306 in a way that either completely fills the box beam channels, forms a barrier between the channel walls 909, 911, 913, 915, 917, 919, 923, 925, 929, 931, 933, 939 and the box beam(s) 306, and/or fills the box beam(s) 306. The core material may be a fluid, foam, or other lightweight, durable material.

Figure 10:
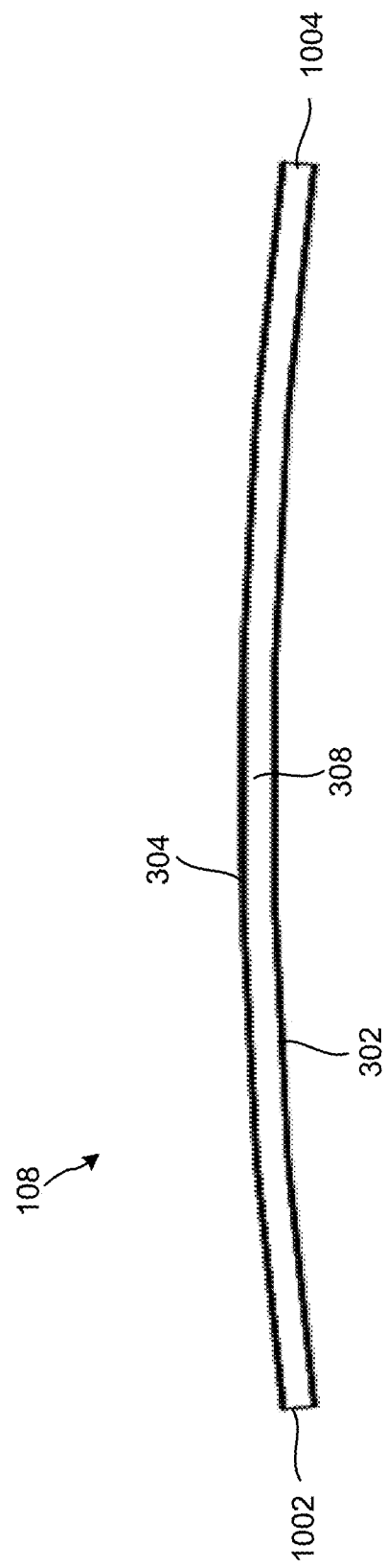
FIG. 10 illustrates a side view of the roof panel according to embodiments of the disclosure.

Referring now to FIG. 10, a roof panel 108 is illustrated according to the present disclosure. The roof panel 108 may include the first outer sheet 302, the second outer sheet 304, and core material 308 disposed between the first outer sheet 302 and the second outer sheet 304. As illustrated, the roof panel 108 may be curved. However, one skilled in the art should appreciate the roof panel being substantially planar without departing from the scope of the present disclosure.

One or more box beams 306 may also be disposed between the first outer sheet 302 and the second outer sheet 304 of the roof panel 108. The box beam(s) 306 may extend from a first end 1002 to a second end 1004 of the roof panel 108 with exemplary dimensions as described for the modular side panels 104 as described above. Inclusion of the box beam(s) 306 within the roof panel 108 may provide added strength to the roof panel 108 and may add significant strength and protection in the event of a rollover of the modular vehicle. It should be appreciated by those skilled in the art that other roof panel constructions may be implemented for integration with a modular side panel and joiner to construct a modular vehicle compartment according to the present disclosure. Inclusion of a box beam(s) 306 within the roof panel 108 may also allow for harness and refrigerant lines, etc. to be passed through the roof panel 108. This may be particularly beneficial when an air conditioning unit is placed atop the roof panel 108.

Figure 11:
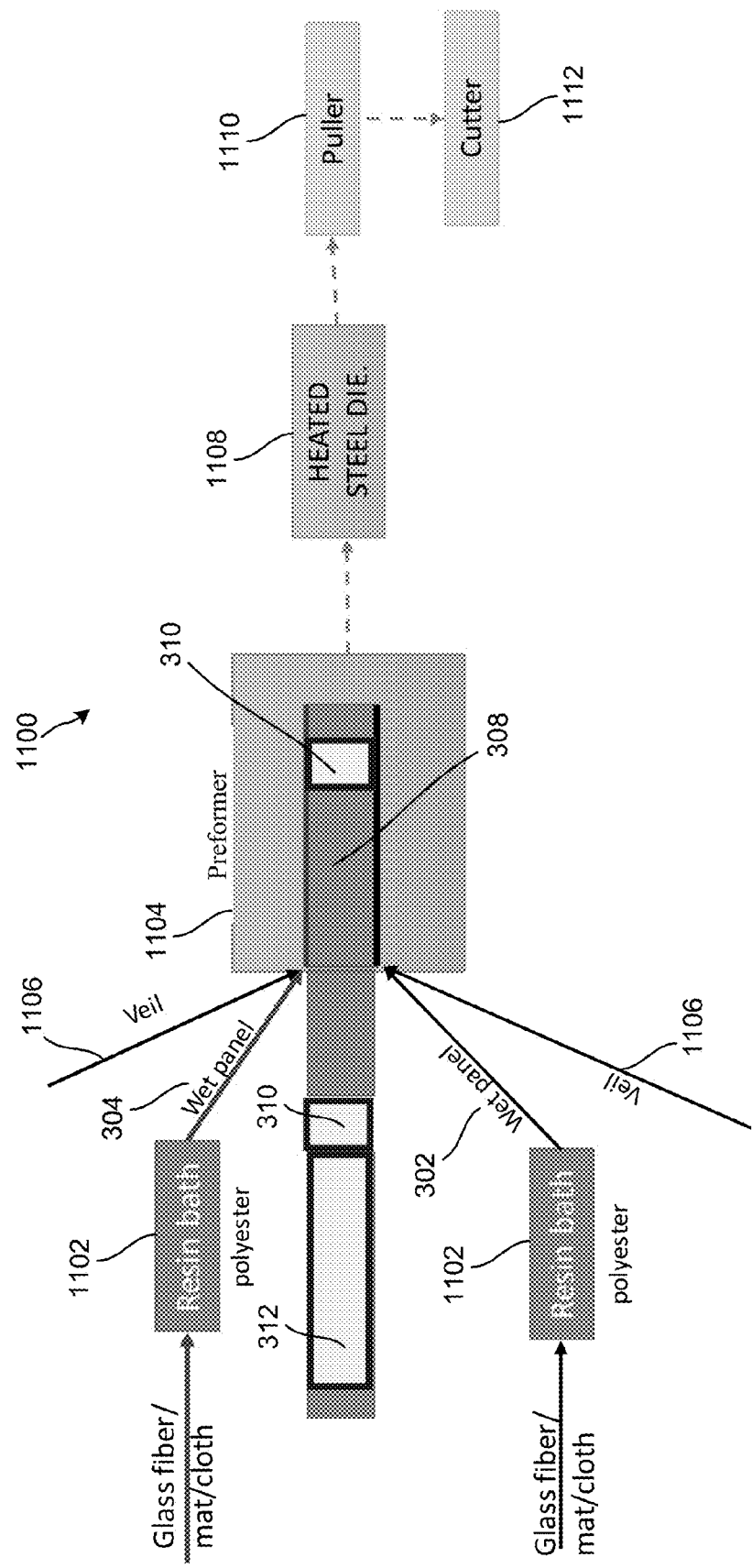
FIG. 11 illustrates a system for constructing a panel according to embodiments of the disclosure.

Referring to FIG. 11, a system 1100 for forming the side (and possibly roof) panels 104, 108 is disclosed. The system 1100 is configured to limit delamination of the elements of the panels 104, 108. The outer sheets 302 and 304 are created by running glass fiber, mat, or cloth through a resin (e.g., polyester) bath 1102. In an example, each outer sheet 302, 304 may have a thickness of about 0.05 inches to about 0.15 inches. The wet outer sheets 302, 304 containing resin are moved to separate walls of a preformer 1104. At the preformer 1104, the beams 310, 312 and the core material 308 are strategically placed at locations between the outer sheets 302, 304. Veils 1106 may be applied to the outer sheets 302, 304 just before or while the wet outer sheets 302, 304 enter the preformer 1104. The veils 1106 are additional materials/layers added to the laminar structure during construction that provide additional characteristics, such as assisting in the protection of the outer sheets 302, 304 from wear, tear, and other degradation. As the outer sheets 302, 304 are moved through the preformer 1104, the preformer 1104 applies pressure to exterior sides of the outer sheets 302, 304 to press the sheets 302, 304 against the beams 310, 312 and the core material 308, thereby producing a panel having a desired cross-section and size. The resulting pressed panel is moved to a heated steel die 1108 that maintains the shape of the panel and cures the resin of the panel.

While the heated steel die 1108 is illustrated as being separate from the preformer 1104, one skilled in the art should appreciate the heated steel die 1108 being integrated within the preformer 1104 without departing from the scope of the present disclosure. The cured panel is pulled by a puller 1110 from the heated steel die 1108 and sent to a cutter 1112, where window holes and wheel well(s) may be cut into the panel. In an example, after the panel is cured but prior to the panel reaching the cutter 1112, the outer surfaces of the panel may be laminated/finished (not illustrated). That is, a decorative interior/exterior surface material may be applied as a finish for a fully constructed modular panel prior to cutting of the modular panel.

Figure 12:
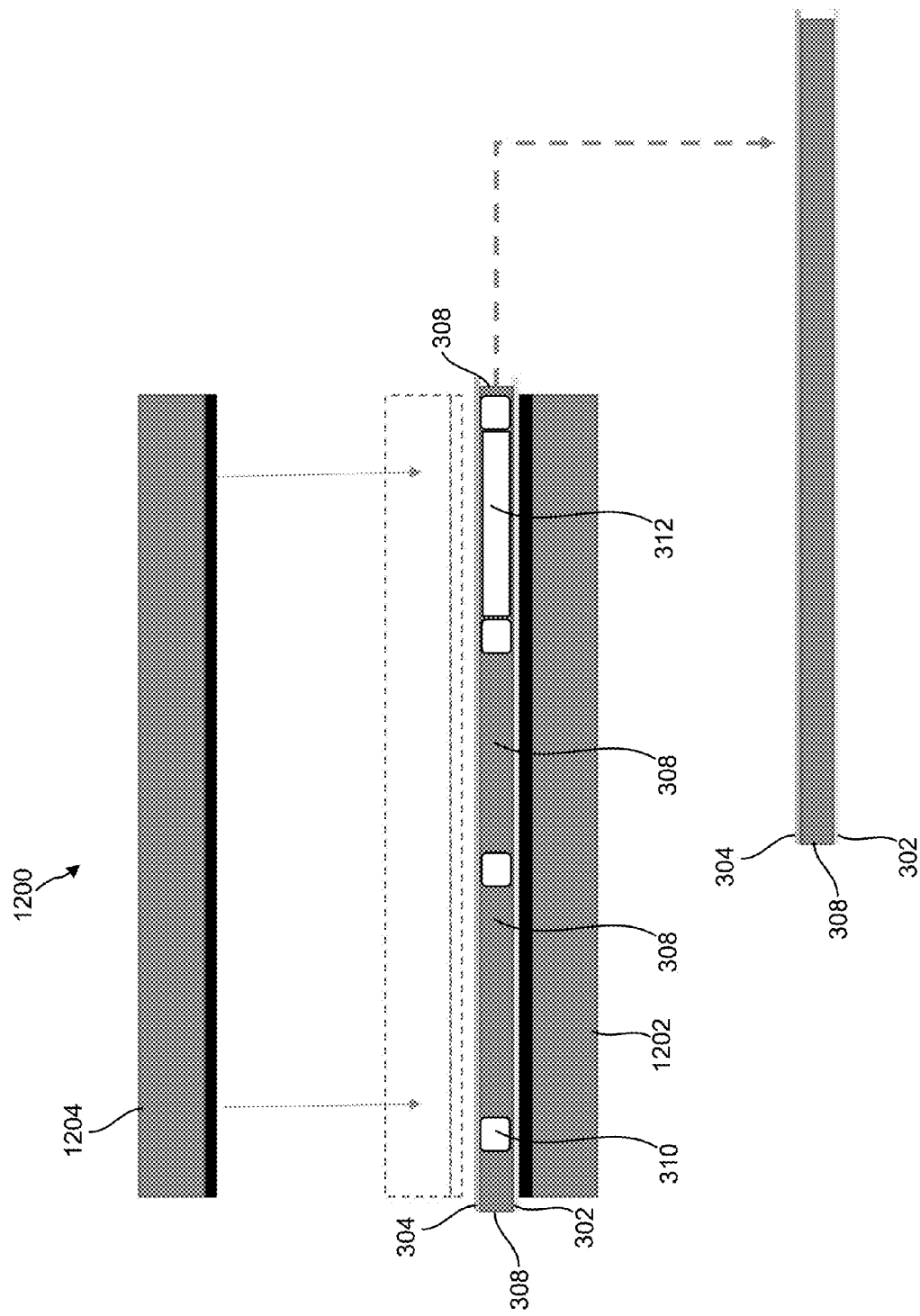
FIG. 12 illustrates an alternative system for constructing a panel according to embodiments of the disclosure.

FIG. 12 illustrates an alternative system 1200 for forming the panels 104, 108. An outer sheet 302 is disposed upon a lower press 1202. A bonding agent such as resin, epoxy, or the like is disposed upon an upper surface of the outer sheet 302 (i.e., the surface not contacting the lower press 1202). Pultrusions 310, 312 and core material 308 are strategically placed upon the bonding agent covered surface of the outer sheet 302 in a manner that addresses weight and structural considerations. Bonding agent is placed upon exposed surfaces of the pultrusions 310, 312 and core material 308. Another outer sheet 304 is disposed upon the bonding agent covered surfaces of the pultrusions 310, 312 and core material 308. An upper press 1204 is brought in contact with the outer sheet 304, and pressure is applied to the outer sheets 302, 304 by the presses 1202, 1204 until a panel according to the present disclosure is obtained. Moreover, the presses 1202, 1204 may introduce heat to the material interposed therebetween. Addition of heat allows for the curing process to be achieved more rapidly.

Figure 13:
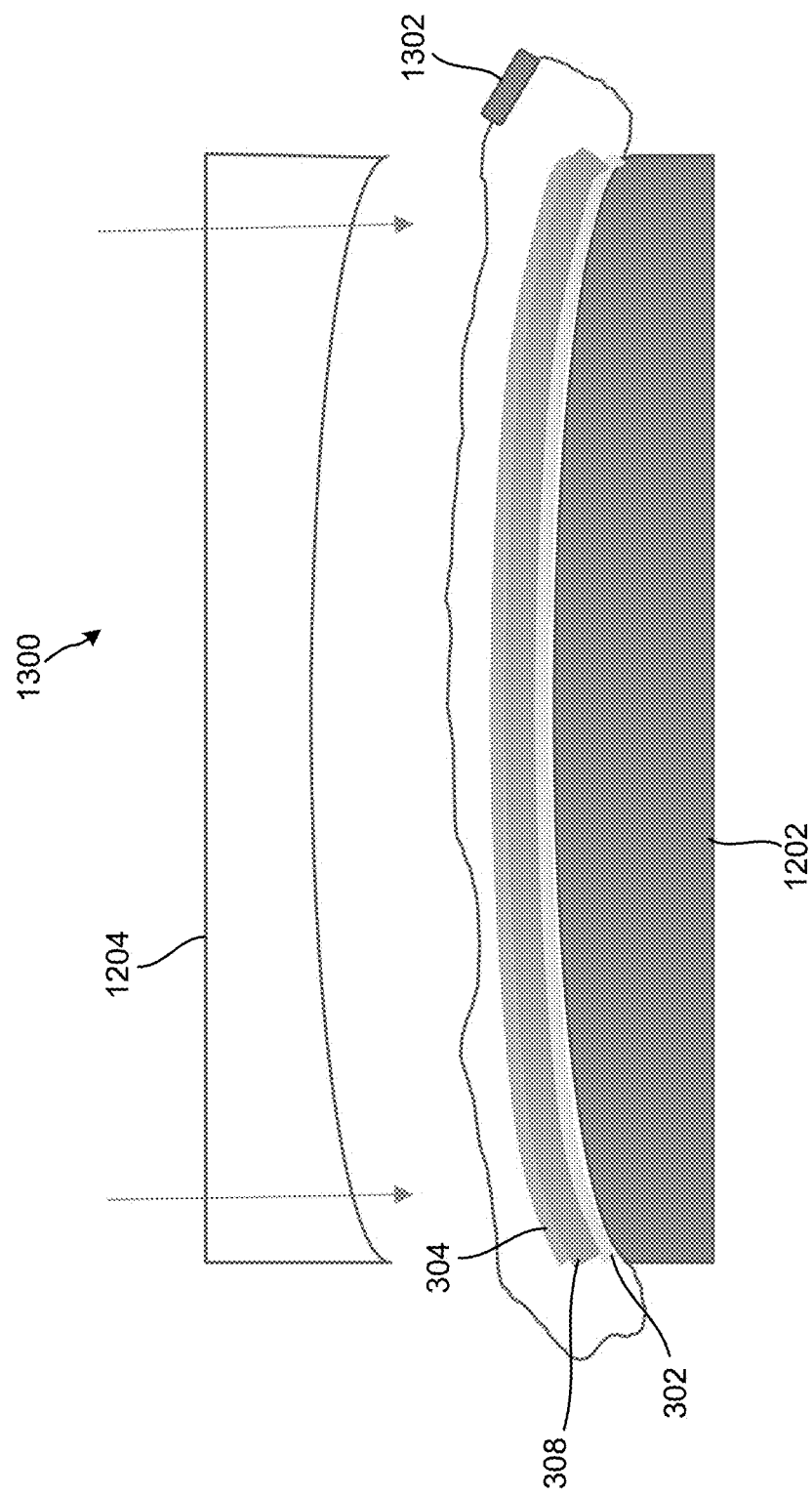
FIG. 13 illustrates an alternative system for constructing a panel according to embodiments of the disclosure.

Referring to FIG. 13, a still further alternative system 1300 for forming the panels 104, 108 is described. An outer sheet 302 is disposed within a vacuum bag 1302. A bonding agent such as resin, epoxy, or the like is disposed upon an upper surface of the outer sheet 302 (i.e., the surface not contacting the vacuum bag 1302). Core material 308 is placed upon the bonding agent covered surface of the outer sheet 302 in a manner that addresses weight and structural considerations. Bonding agent is placed upon an exposed surface of the core material 308 and another outer sheet 304 is disposed upon the bonding agent covered surface of the core material 308. Upper and lower presses 1204, 1202 are brought in contact with the vacuum bag 1302, and pressure is applied to the outer sheets 302, 304 by the presses 1202, 1204 and vacuum bag 1302 (i.e., air is removed from the vacuum bag 1302) until a panel according to the present disclosure is obtained. Moreover, the presses 1202, 1204 may introduce heat to the material interposed therebetween. Addition of heat allows for the curing process to be achieved more rapidly. In an example, the upper press 1204 is not utilized. According to this example, the only forces applied to the materials of the panel are from the vacuum bag 1302 when air is removed from the vacuum bag 1302.

As described with respect to FIG. 13, materials of the panel are added into the vacuum bag 1302 as they are layered. However, one skilled in the art should appreciate the materials of the panel not being added to the vacuum bag 1302 until layering of the materials is complete. Moreover, while the illustrated panel produced by the system 1300 does not include pultrusions 306, one skilled in the art should appreciate the panel produced by the system 1300 including pultrusions 306 placed for weight and structural considerations.

As described with reference to FIGS. 11 through 13, the panels according to the present disclosure may be formed with the box beams 310, 312 being uncoupled or unattached to each other (i.e., they are attached by the resin to the outer sheets 302, 304). However, in an alternative implementation the box beams 310, 312 may be coupled prior to the box beams 310 and 312 being formed in a modular panel with the outer sheets 302, 304.

FIGS. 14A through 14D illustrate a mechanism for coupling orthogonally disposed box beams 306 (illustrated in FIG. 14A) using an insert 1400 (illustrated in FIG. 14C). A hole 1402 (illustrated in FIG. 14B) is cut into a side surface of one of the box beams (either the horizontal beam or the vertical beam). A base portion 1404 of the insert 1400 is frictionally fit within an end of a box beam. The insert 1400 may be made of a durable material such as steel, aluminum, or the like. In an example, the insert 1400 may be attached within the end of the box beam using a resin, epoxy, adhesive, or the like. An extension portion 1406 of the insert is mated to or inserted through the hole 1402 cut out of the orthogonal box beam. The extension portion 1406 of the insert 1400 inserted through the hole 1402 may be maintained in position using friction, or may be held in position using a bonding agent such as a resin, epoxy, adhesive, or the like.

Figure 15A:
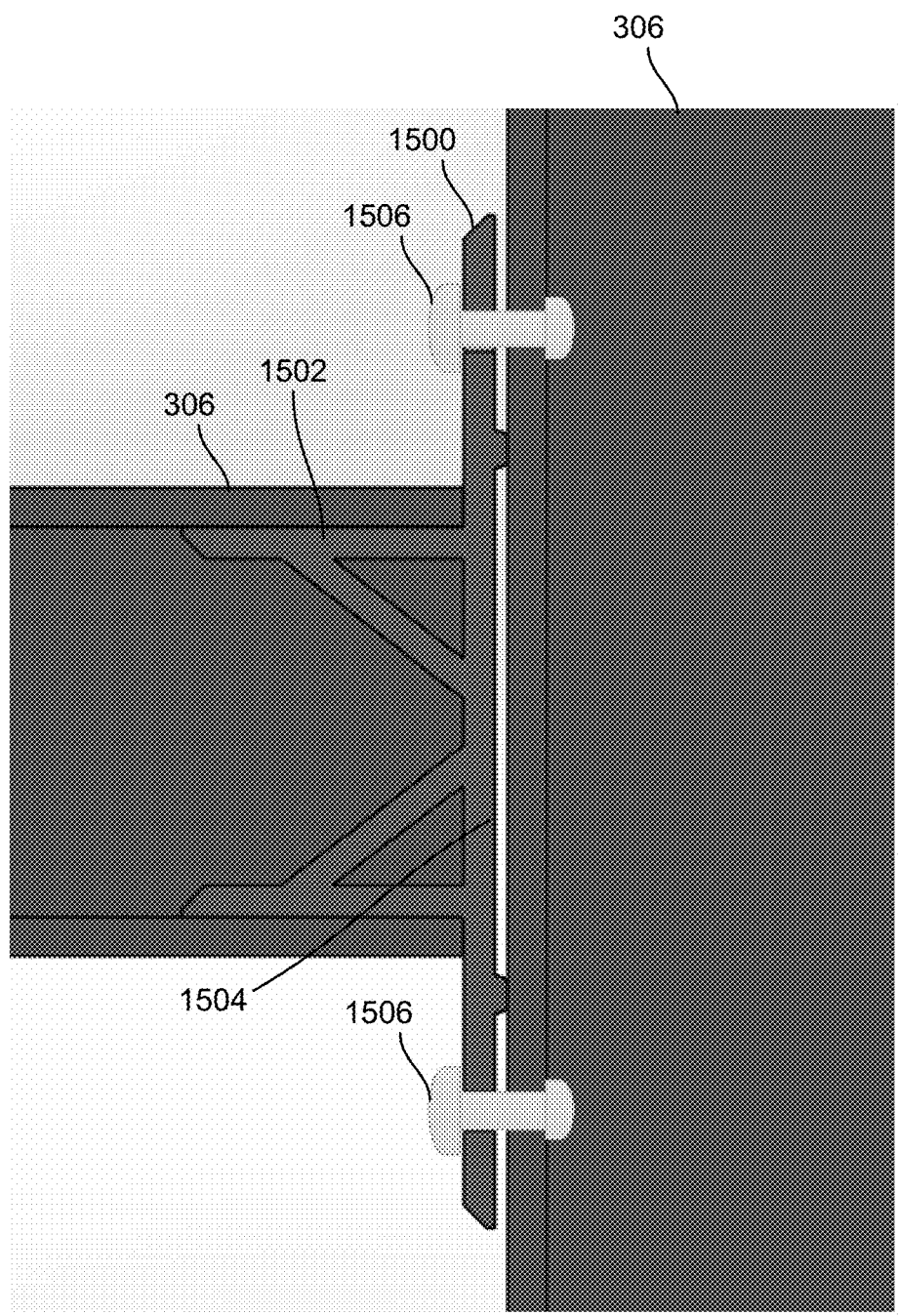
FIG. 15A illustrates orthogonal pultrusions coupled using a bracket according to embodiments of the disclosure.
Figure 15B:
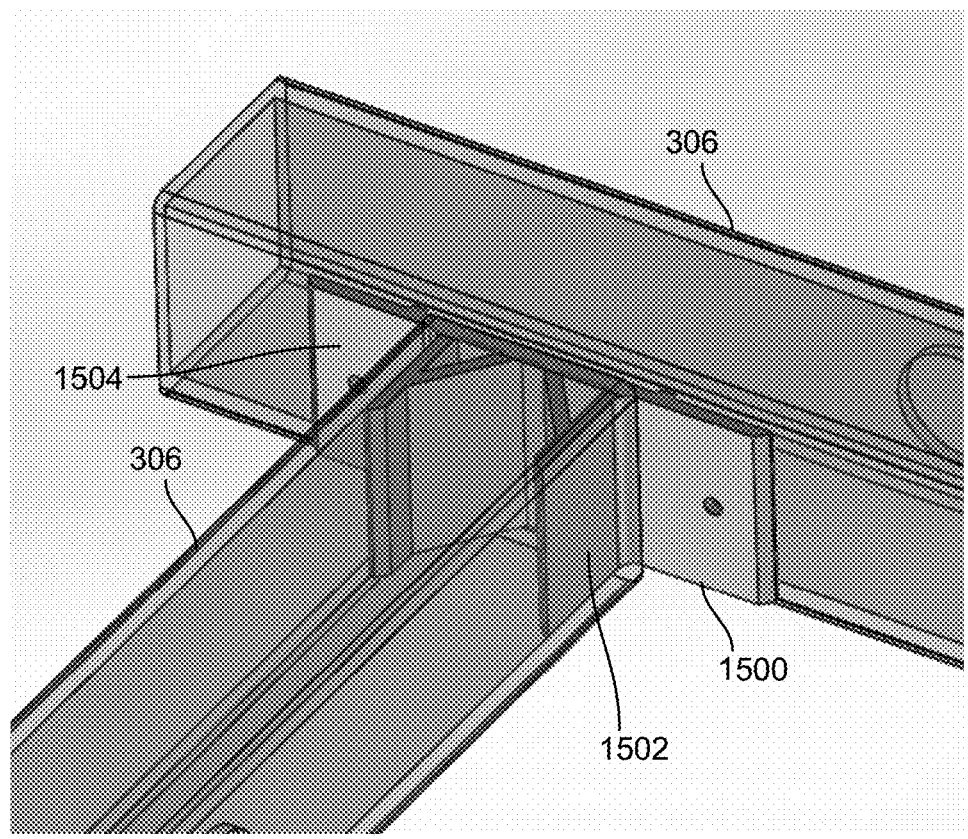
FIG. 15B illustrates orthogonal pultrusions coupled using the bracket according to embodiments of the disclosure.

FIGS. 15A and 15B illustrate an alternative mechanism for coupling orthogonal box beams 306 using a bracket 1500. An insert portion 1502 of the bracket 1500 is fit within an end of a box beam. Fitting of the insert portion 1502 of the bracket 1500 within the end of the box beam may occur frictionally, or through the use of a bonding agent such as epoxy, glue, and the like. The bracket 1500 also has an abutment surface 1504 that couples to a surface of a box beam orthogonal to the box beam that has the insert portion 1502 of the bracket 1500 inserted therein. Coupling of the bracket 1500 to the surface of the box beam may occur through the use of a bonding agent, such as glue or the like, and/or through the use of one or more fasteners 1506 such as rivets, machine screws, or the like, for example. Moreover, the abutment surface 1504 of the bracket 1500 that couples to the surface of the box beam may have one or more edges extending therefrom that increase the efficiency of coupling when using a bonding agent. The bracket 1500 may be a durable material such as aluminum, ABS, nylon, or the like, for example.

Figure 16A:
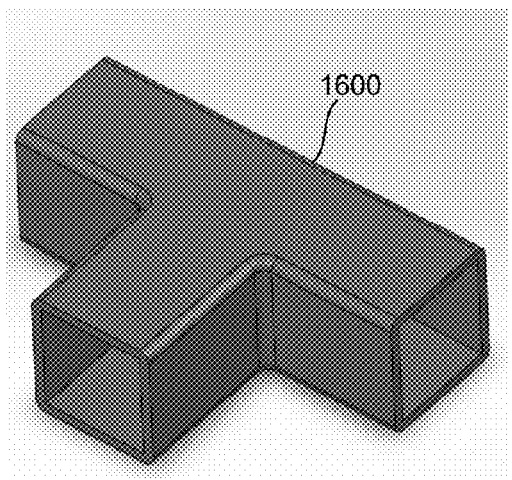
FIG. 16A illustrates a tee-bracket for coupling pultrusions according to embodiments of the disclosure.
Figure 16B:
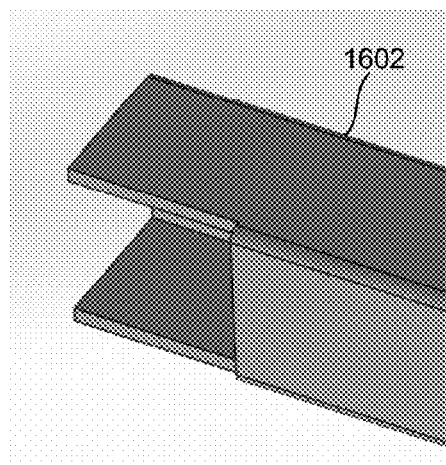
FIG. 16B illustrates a pultrusion having a portion removed from an end thereof for coupling pultrusions using the tee-bracket of FIG. 16A according to embodiments of the disclosure.
Figure 16C:
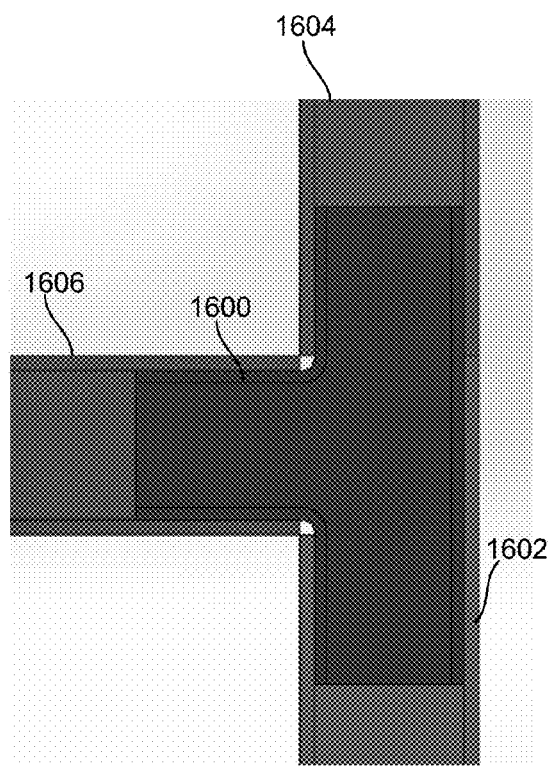
FIG. 16C illustrates pultrusions coupled using the tee-bracket of FIG. 16A according to embodiments of the disclosure.

FIGS. 16A through 16E illustrate a further mechanism for coupling box beams 306 using a tee-bracket 1600 (illustrated in FIG. 16A). As illustrated in FIG. 16B, a portion of a surface at the end of a box beam 1602 is removed and a portion of the bracket 1600 is inserted into the end of the box beam 1602 until a surface of the bracket 1600 orthogonal to the portion of the bracket 1600 inserted into the box beam 1602 abuts a surface of the box beam 1602. This may result in the box beam 1602 housing more of the bracket 1600 than the other box beams 1604, 1606 respectively. The other box beams 1604, 1606 are then coupled to portions of the bracket 1600 not inserted into the box beam 1602. As illustrated, the box beams 1602, 1604, 1606 are coupled to the bracket 1600 in a manner that results in the box beams 1602, 1604, 1606 abutting each other. However, one skilled in the art should appreciate the box beams 1602, 1604, 1606 being coupled to the bracket 1600 in a manner that does not result in the box beams 1602, 1604, 1606 abutting. The box beams 1602, 1604, 1606 may be frictionally coupled to the bracket 1600 and/or may be coupled to the bracket 1600 using a bonding agent. Moreover, if the box beams 1602, 1604, 1606 are installed to abut, the box beams 1602, 1604, 1606 may be coupled to one or more abutting box beam using a bonding agent, for example.

The outer sheets 302, 304 may be one or more of fiber reinforced plastic or fiber reinforced polymer (FRP), an electrically-conductive polymer, gel coatings, resins, thermoplastic polyolefin (TPO), carbon fiber, aluminum (e.g., stainless), acrylonitrile butadiene styrene (ABS), etc. The outer sheets 302, 304 may also be coated or provide decorative appeal to the panel 104.

The box beams 306 may be formed of a pultruded combination of fiberglass reinforcements and thermosetting polyester or vinyl ester resin systems, such as those sold under the name EXTREN® by Strongwell Corporation. The pultruded box beams 306 may provide corrosion resistance, low thermal conductance, low electrical conductance, electromagnetic transparency, light weight, high strength, fire resistance, and/or dimensional stability to the modular panel 104. The box beams 306 may also be formed of aluminum, steel, wood, acrylonitrile butadiene styrene (ABS), or a like durable material, for example.

While the positions of the box beams 306 in the panel 104 are described and illustrated in connection with a panel of a vehicle, the box beams 306 may be positioned in other locations to provide strength for other types of applications. For example, in the case of a solid wall, vertically oriented box beams 310 may be equally spaced along a length of the wall, and/or horizontally oriented box beams 312 may be equally spaced along a height of the wall. In some applications, the location and position of the box beams 306 are tailored to areas where additional components may be connected to and supported by the panel 104 or other structure formed in a similar manner as the panel 104.

Further, while the pultruded box beams 306 are described and illustrated as having a square or rectangular cross-sectional shape, the box beams 306 may have other cross-sectional shapes. For example, the box beams 306 may have triangular, trapezoidal, or other polygonal cross-sections that have appropriate strength and surface area.

The core material 308 may be a foam, or other material. In one example, the core material 308 may be a light weight fill material, such as, foam sheets, polymer sheets, honeycomb polymer or metal, injectable foam or polymer. The core material 308 may be polyurethane, polystyrene or other light weight polymer in any form (foam, honeycomb, sheet, injectable, etc.), balsa wood, and other lightweight materials. The core material 308 may also be selected to provide certain properties. For example, the core material 308 may be selected to provide additional strength, corrosion resistance, thermal insulation, etc.

Although the chassis herein is described as having a "u-shaped" channel for receiving edges of side panels, it should be appreciated that the u-shaped channels could include other geometries and features to facilitate interconnection of the side panels to the chassis.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Moreover, it should be apparent to one skilled in the art, that the disclosure may be practiced without some or all of the specific details and steps disclosed herein.

Figure 17A:
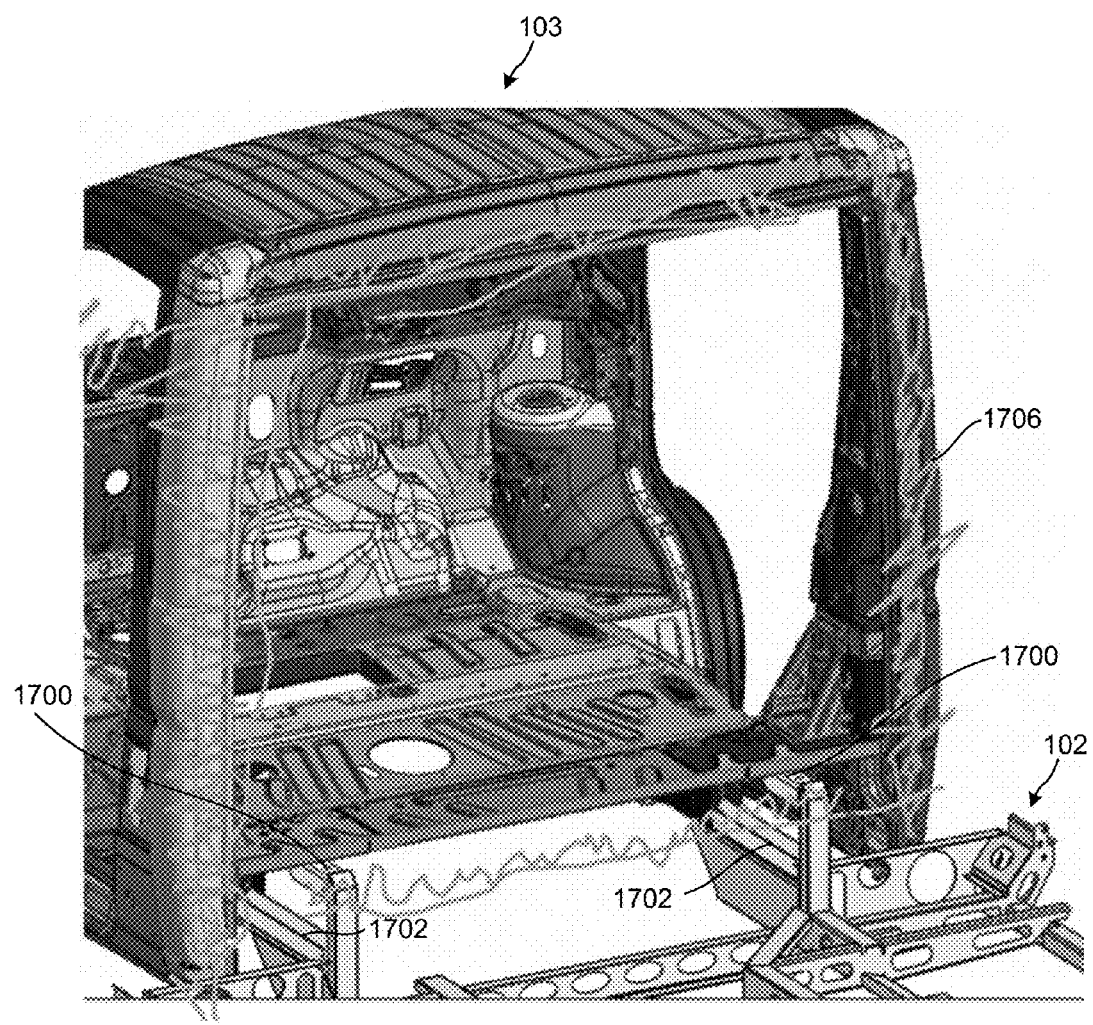
FIGS. 17A-17M illustrate major aspects of construction of a modular paratransit bus according to the disclosure.

FIGS. 17A-17M illustrate major aspects of construction of a modular paratransit bus according to the disclosure. A cab 103 is generally received as a constructed assembly from a vehicle manufacturer such as Chrysler®, Ford®, General Motors®, or Promaster®, and a chassis 102 having u-shaped channels 200 is mechanically fastened to the cab 103. In this illustrative embodiment the cab 103 is configured with beam receivers 1700 and the chassis 102 is configured with protruding beams 1702 for insertion into the beam receivers 1700 (illustrated in FIG. 17A). Mechanical fasteners such as nuts/bolts, welds, or the like may be implemented to retain the beams 1702 in the beam receivers 1700.

Figure 17B:
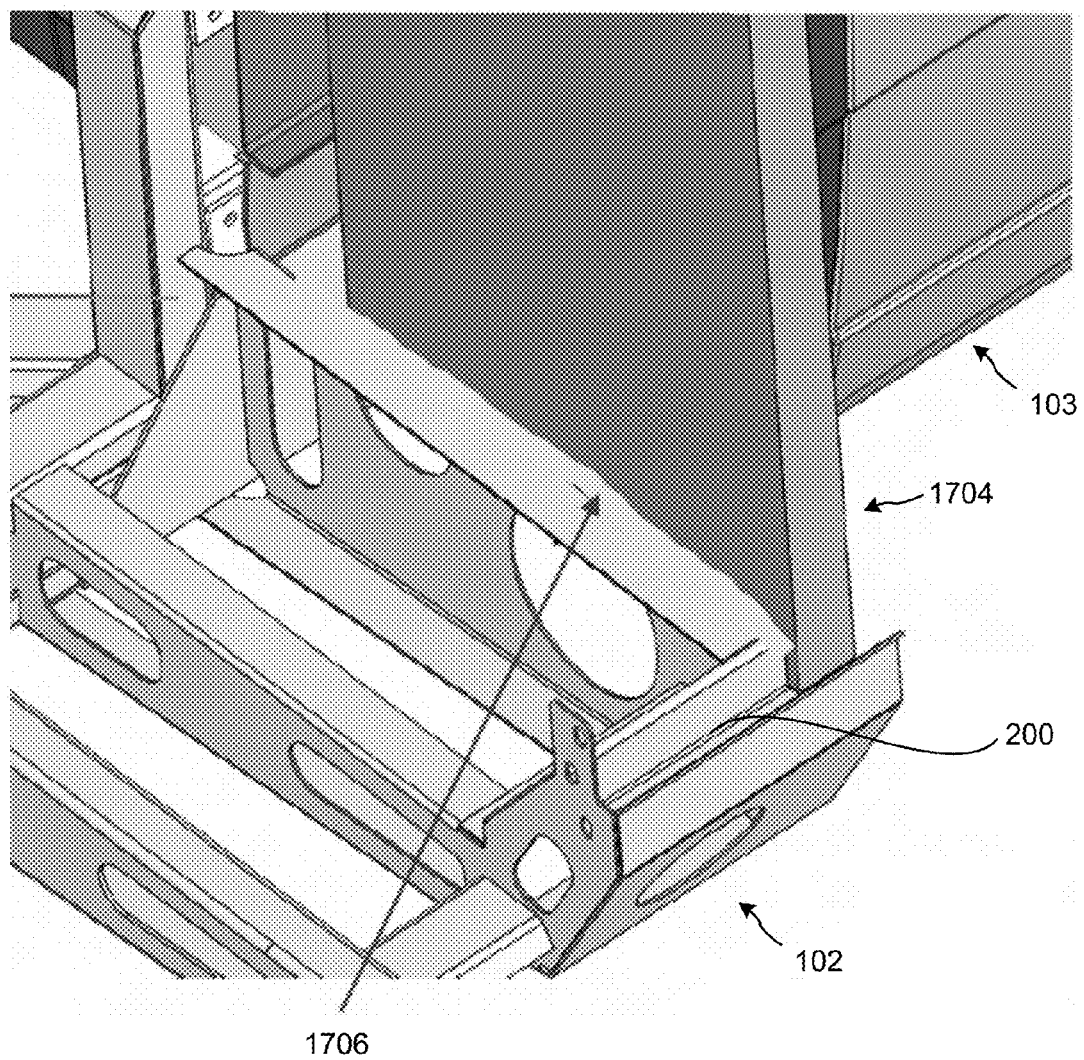
Figure 17C:
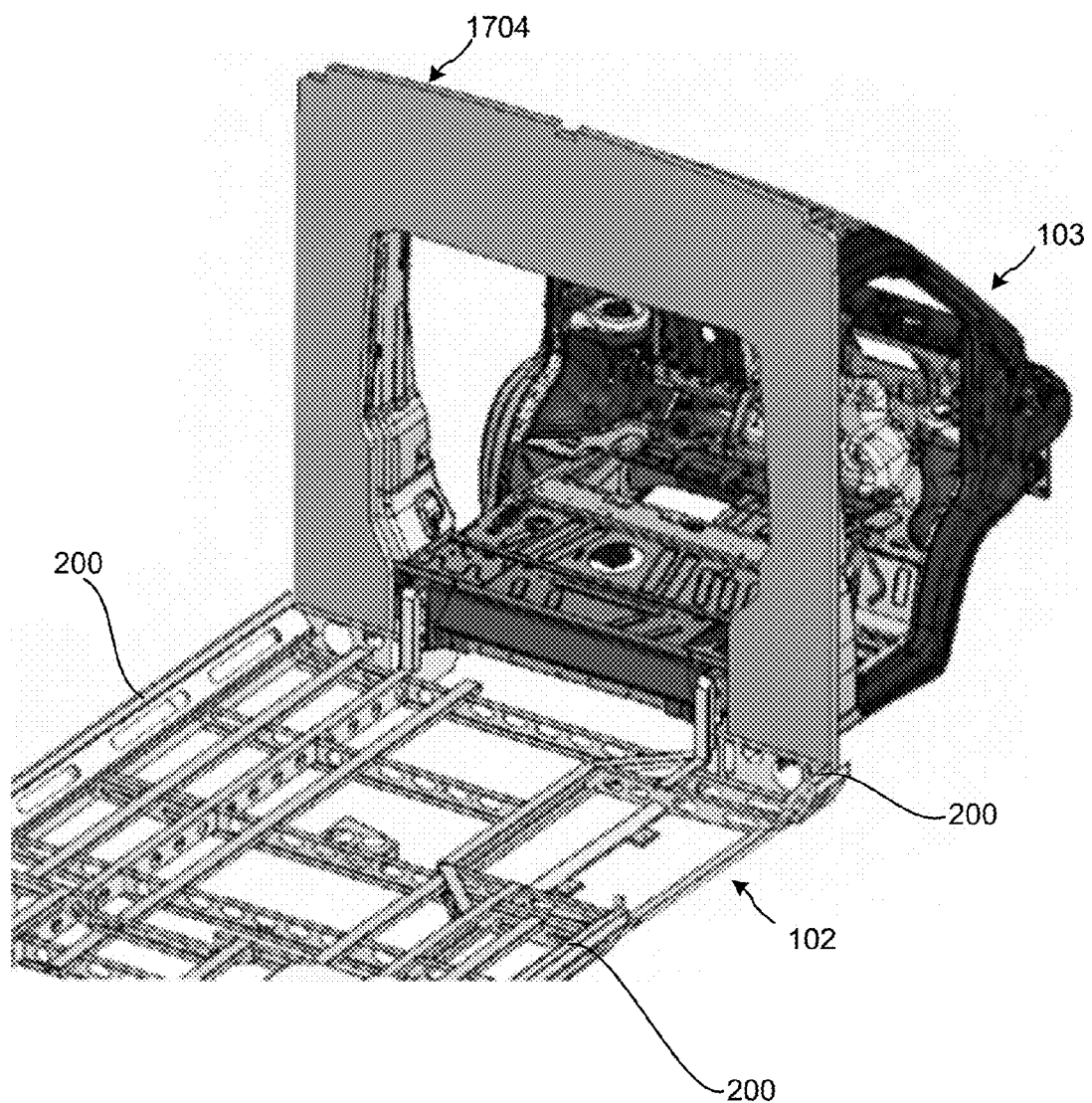

FIGS. 17B and 17C illustrate installation of a front panel 1704 to the cab 103 and the chassis 102. The front panel 1704 is placed centrally along a width of the cab 103 and/or the chassis 102. Shims may be used to properly align the front panel 1704. The front panel 1704 may be fastened to the cab 103 and/or the chassis 102 using an adhesive 1706. For example, a bead of adhesive 1706 may be layered along a back surface of the cab 103, a top surface of the chassis 102 proximate the back surface of the cab 103, and/or surfaces of the front panel 1704 that mate with surfaces of the cab 103 and chassis 102 once installed. Additionally or alternatively, other fasteners, such as nuts/bolts, screws, or the like may be used to couple the front panel 1704 to the cab 103 and/or chassis 102. In an example, three (3) screws are used to couple the front panel 1704 to a bulkhead panel of the cab 103.

Figure 17D:
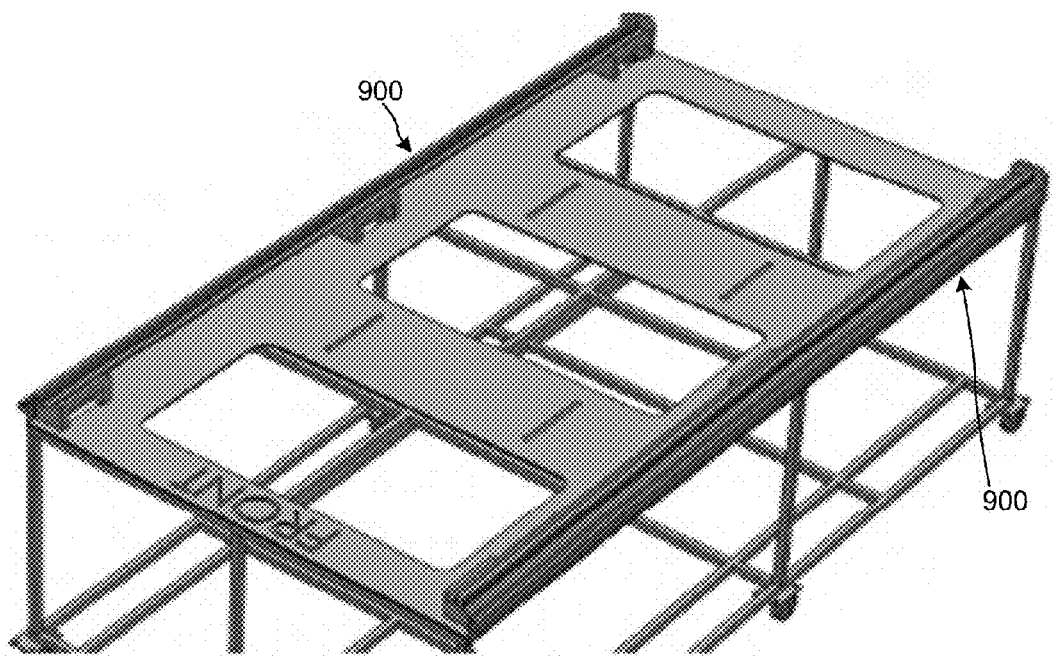
Figure 17E:
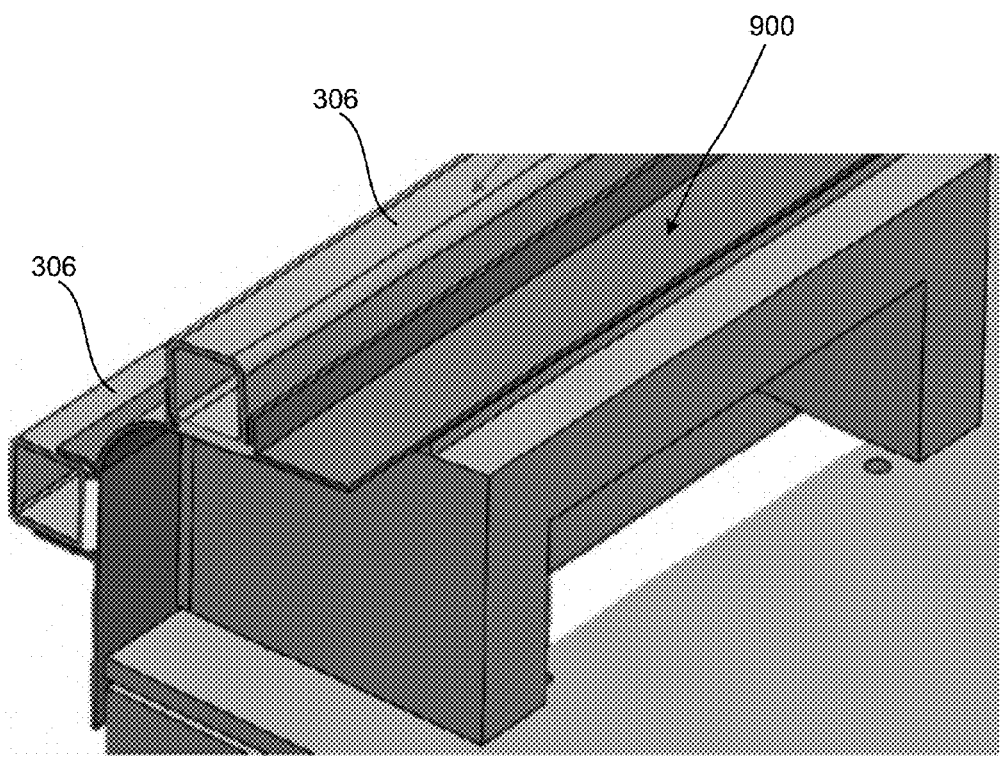
Figure 17F:
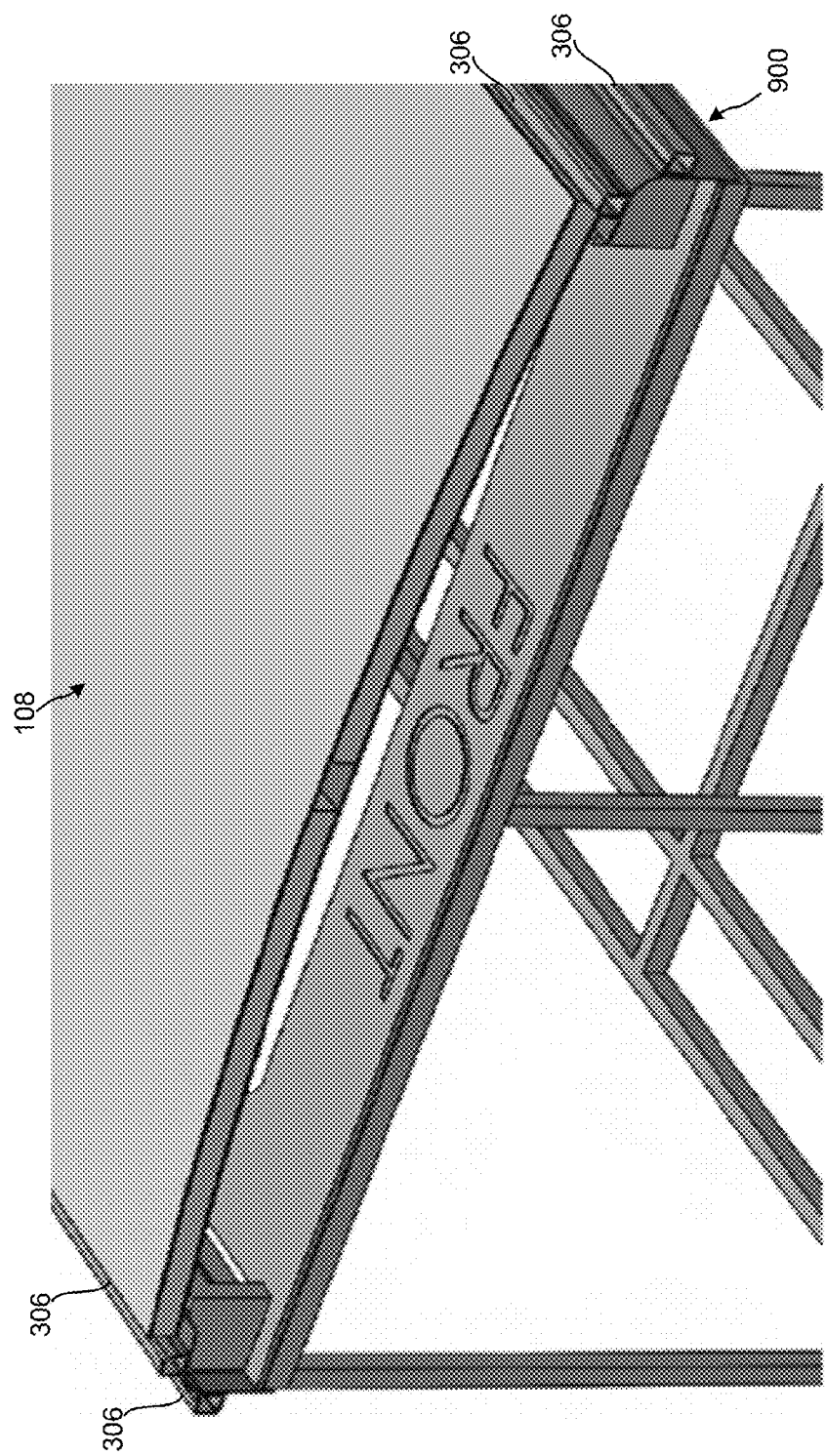

FIGS. 17D through 17F illustrate installation of the roof panel 108 onto inner extrusions 900 of structural joiners 106. As illustrated in FIG. 17D, the structural joiners may be held in a a jig or frame so that pultrusions or box beams 306 are inserted into channels of the inner extrusions 900. The pultrusions 306 may be held into the channels using clamps, such as deep throat clamps, for example. In an example, the pultrusions 306 may be bonded to the inner extrusions 900 using an adhesive, such as the adhesive 1706.

Figure 17G:
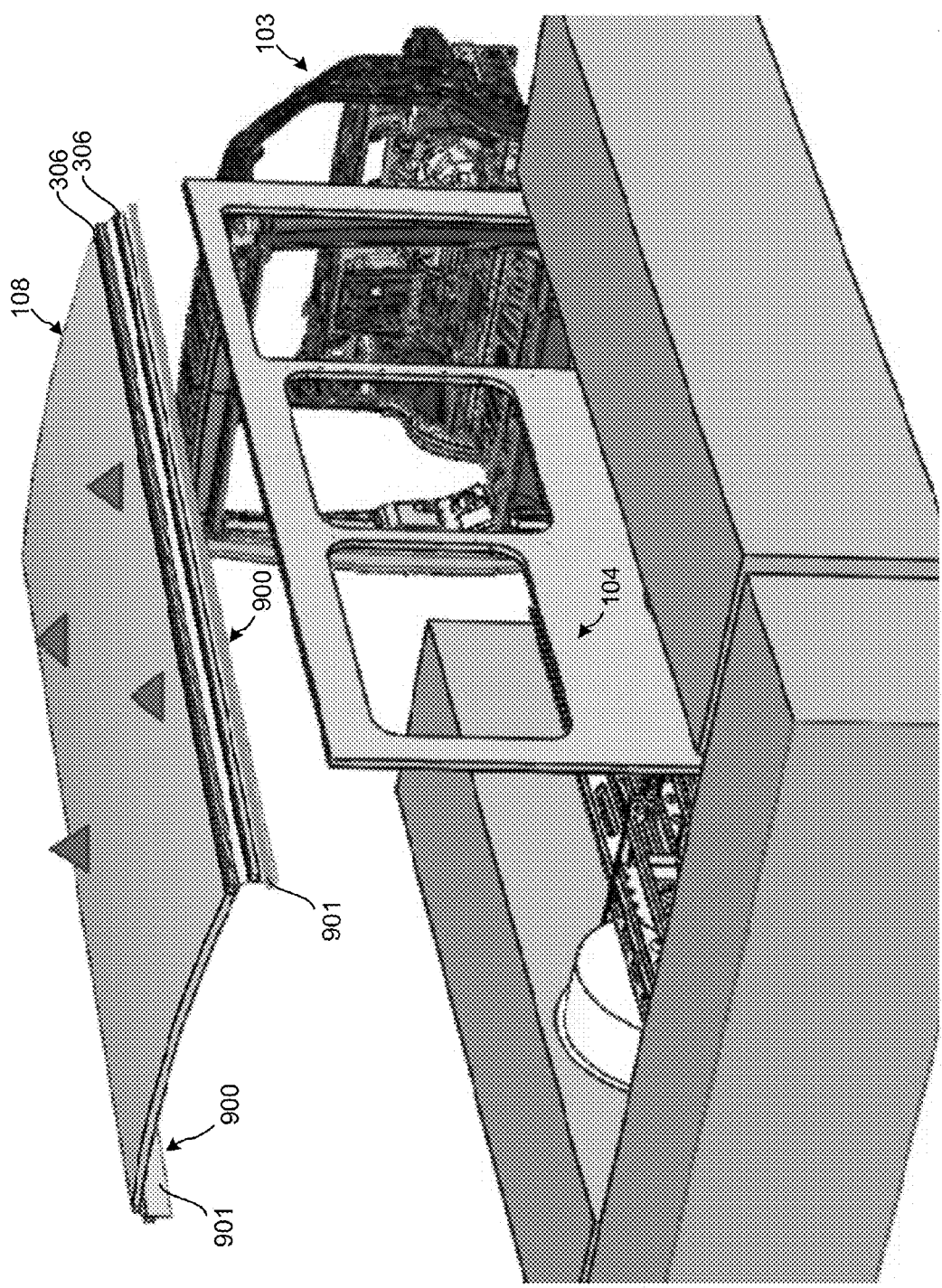
Figure 17H:
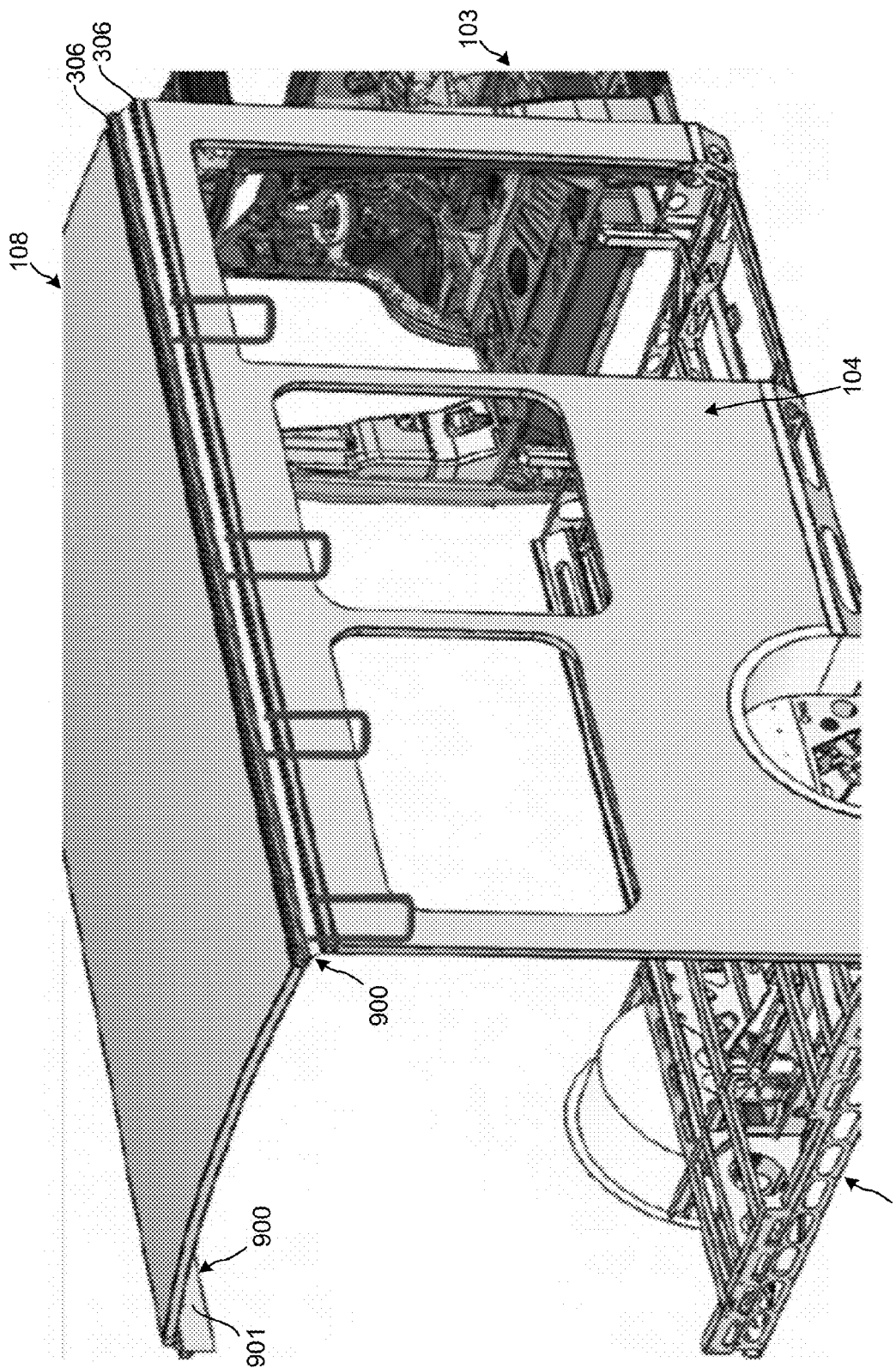
Figure 17I:
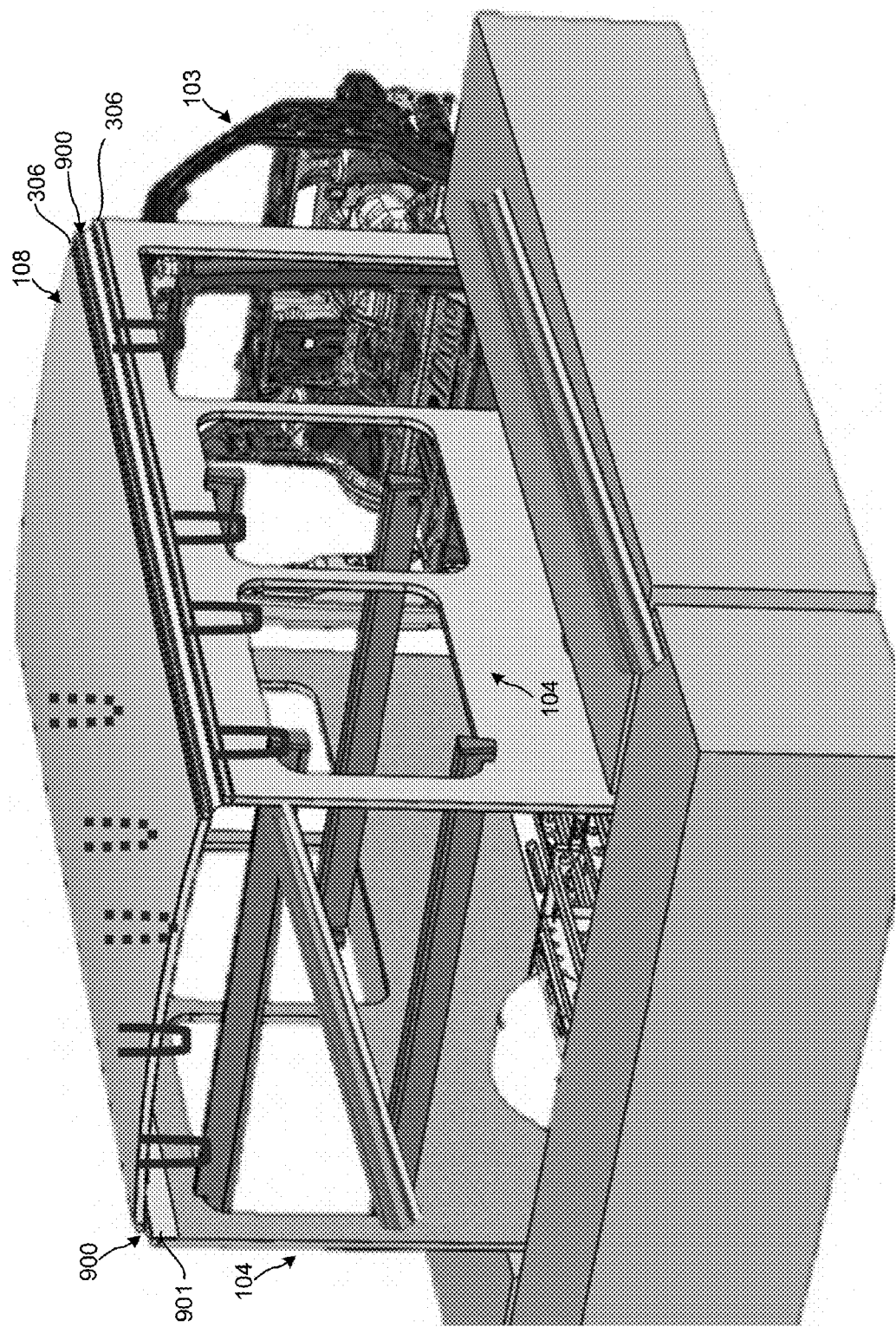

FIGS. 17G through 17I illustrate coupling of the inner extrusions 900 of the structural joiner 106 to the side panels 104. Each side panel 104 is mated to walls of the support channel 901 of an inner extrusion 900. The side panel 104 may be coupled to a support channel 901 using an adhesive, such as the adhesive 1706. If an adhesive is used, clamps, such as deep throat claims, may be used to hold the side panels 104 and inner extrusions 900 together to ensure adequate coupling.

Figure 17J:
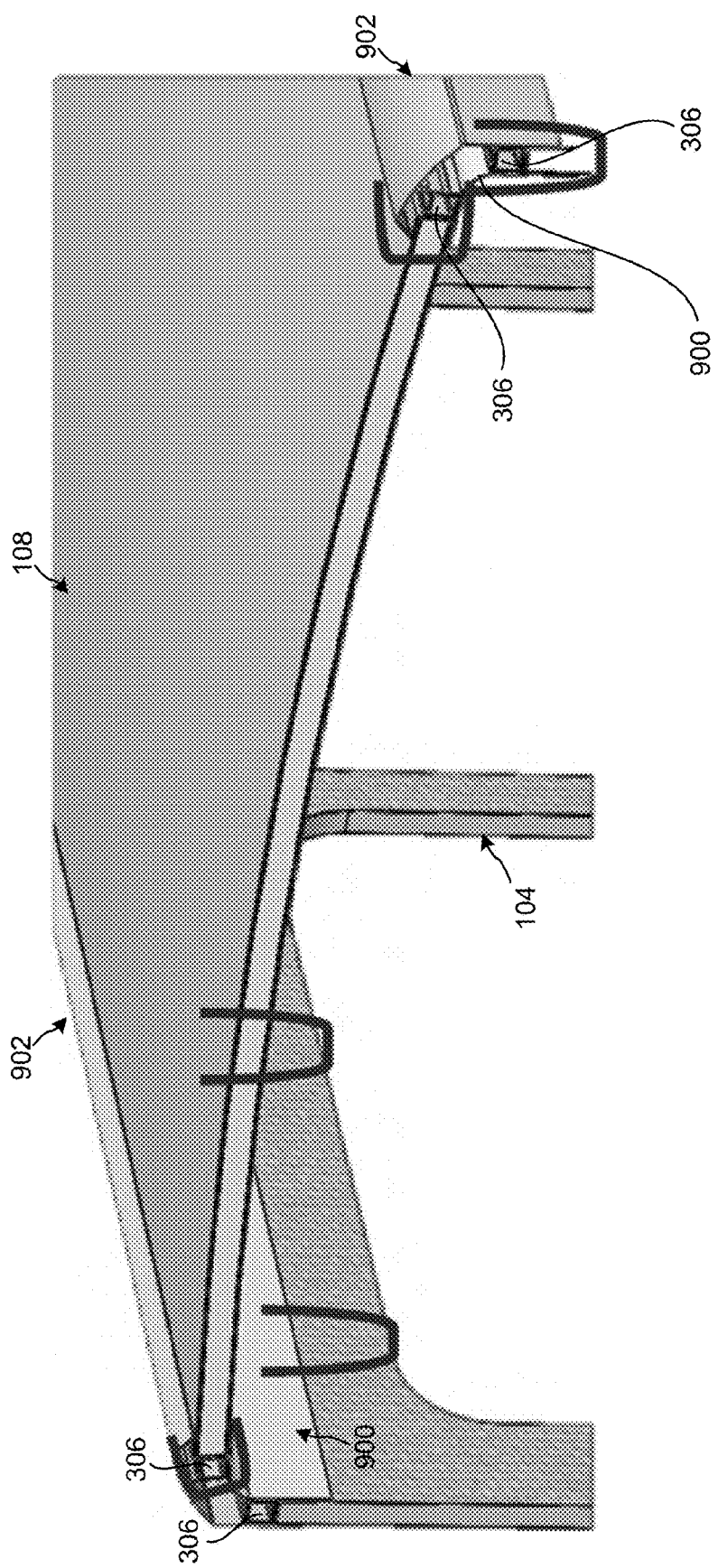

FIG. 17J illustrates installation of the outer extrusions 902. Each outer extrusion 902 has box beam channels 927, 935 that receive the box beams 306. Each outer extrusion 902 also has surfaces that mate with and couple to the roof panel 108 and a side panel 104 respectively. Coupling of the outer extrusions 902 of the joining structure 106 to the box beams 306, roof panel 108, and side panels 104 may involve the use of an adhesive and/or mechanical fasteners, such as screws, nuts/bolts, welds, or the like.

Figure 17K:
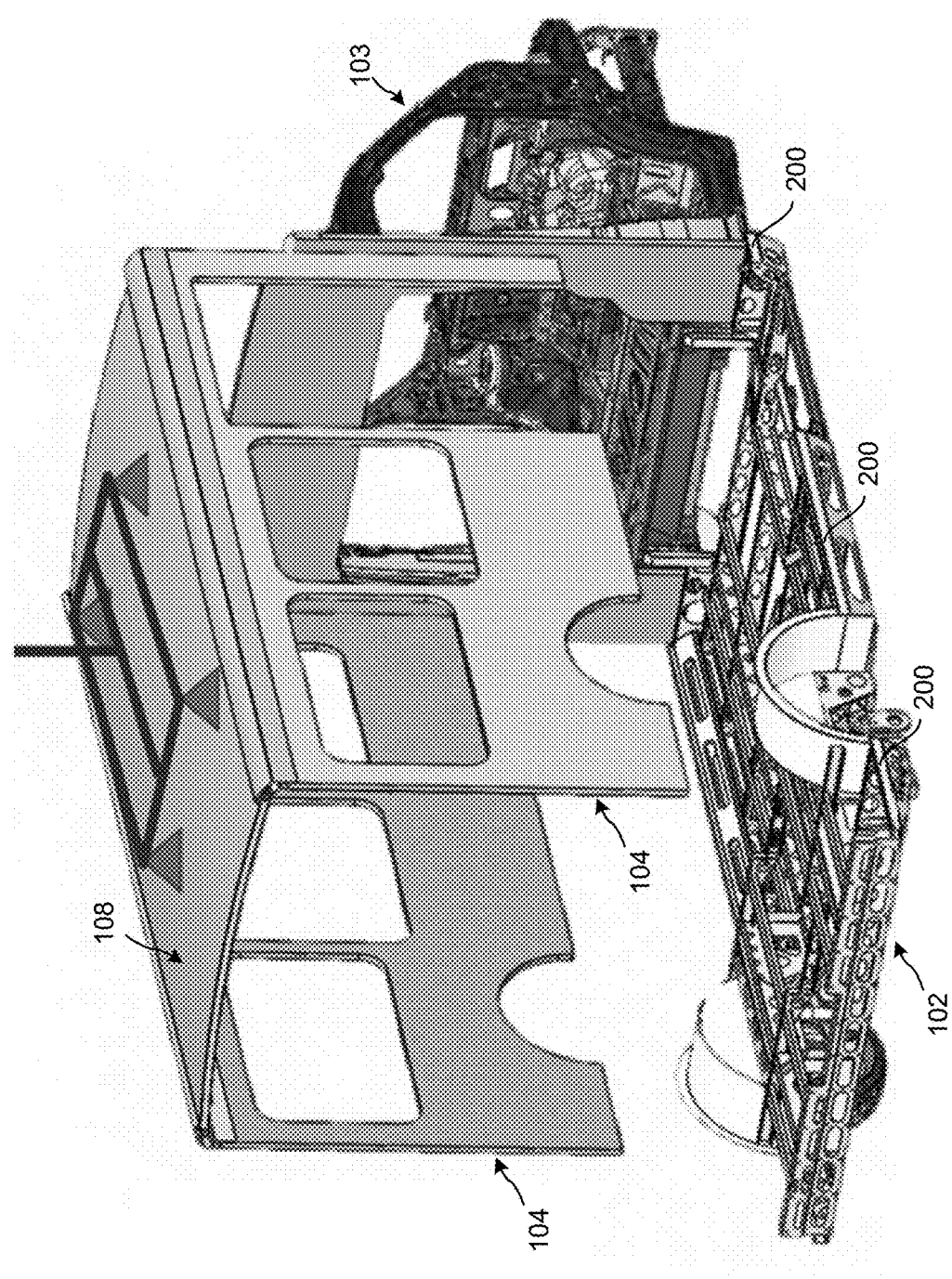
Figure 17L:
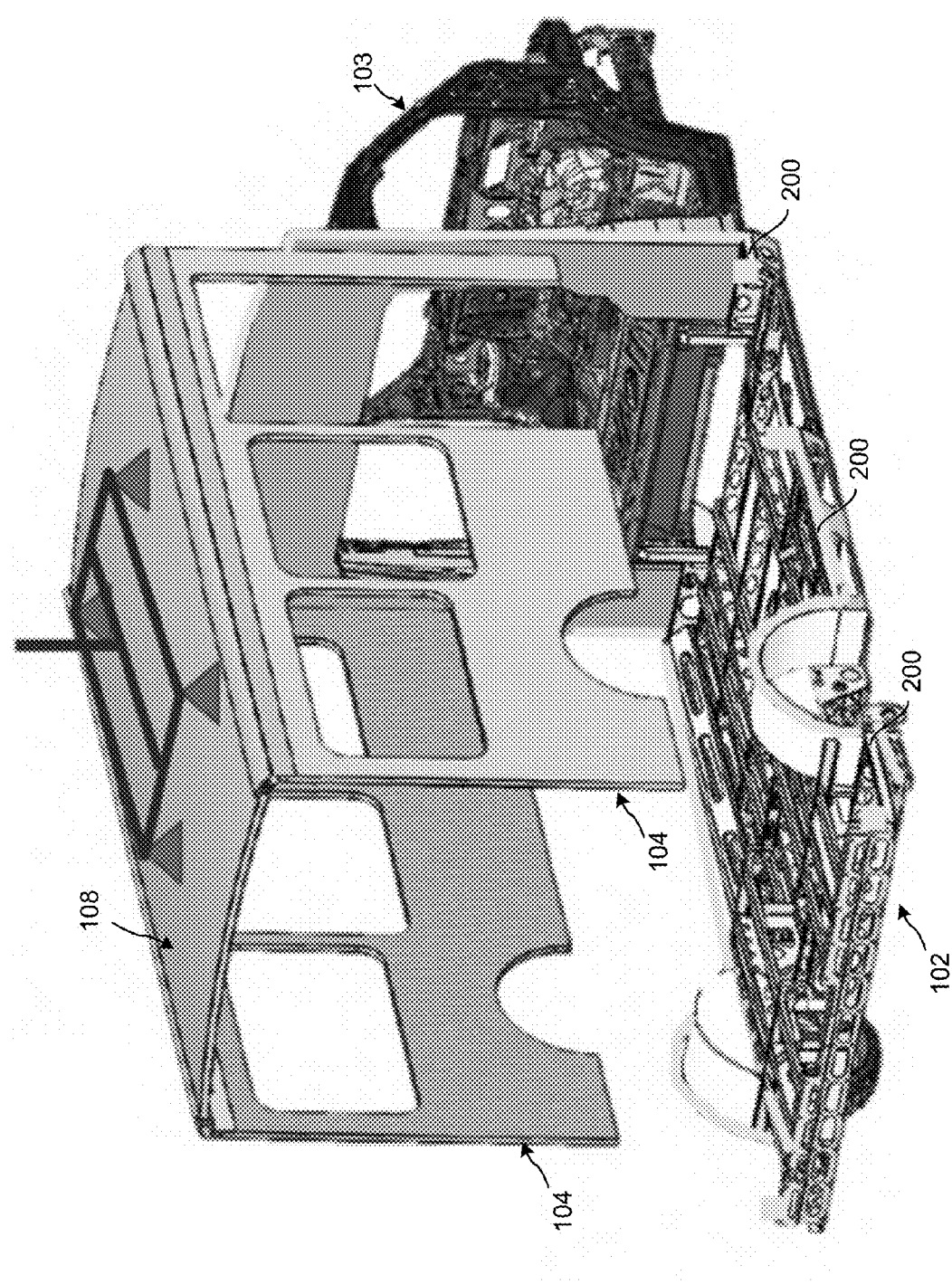

FIGS. 17K and 17L illustrates installation of side and roof panels 104, 108 onto the chassis 102. Portions of the side panels 104 are received by the u-shaped channels 200 of the chassis 102. Coupling of the side panels 104 to the u-shaped channels 200 may involve the use of an adhesive and/or mechanical fasteners, such as screws, nuts/bolts, welds, or the like. A downward force may be applied to the top of the roof panel 108 and an upward force may be applied to the bottom of the chassis 102 to ensure adequate coupling of the side panels 104 to the chassis 102. Moreover, shims may be used to ensure the side panels 104 are positioned desirable within the u-shaped channels 200.

Figure 17M:
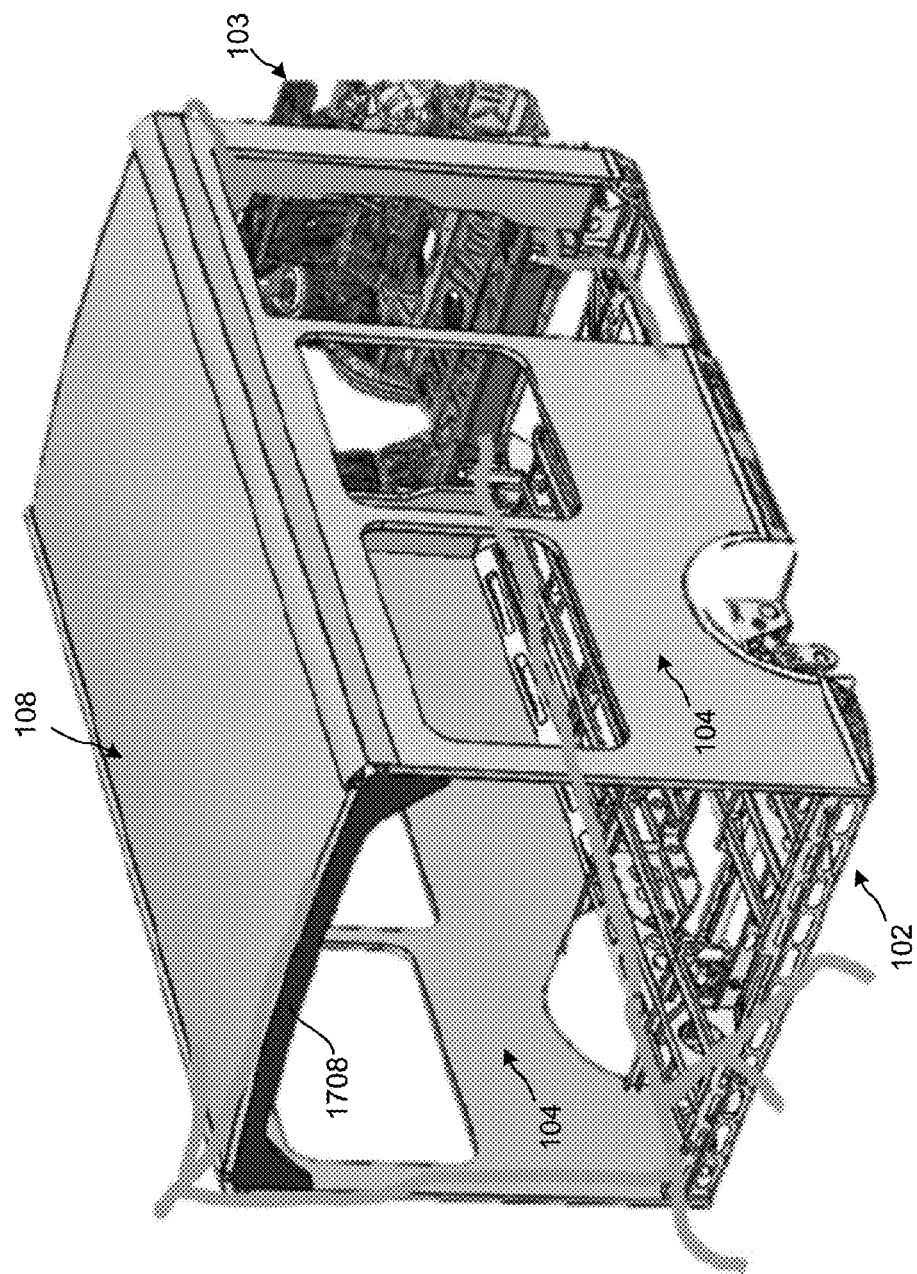

FIG. 17M illustrates an assembled modular paratransit bus according to the disclosure. A back panel 1708 may be coupled to back portions of the roof panel 108 and side panels 104. Coupling of the back panel 1708 may involve the use of an adhesive.

There are several types of adhesives that may be used during assembly of the modular paratransit bus of the present disclosure. For example, a moisture cured, single or double component, polyurethane adhesive may be used. Such a polyurethane adhesive may include Sikaflex® 252 FC, offered by Sika Corporation of Lyndhurst, N.J. Alternatively or in addition, a methyl methacrylate, two (2) component structural adhesive or two (2) component epoxy may be used. An example of a suitable two (2) component structural adhesive is Sikafast® 3131s, offered by Sika Corporation of Lyndhurst, N.J.

Figure 18:
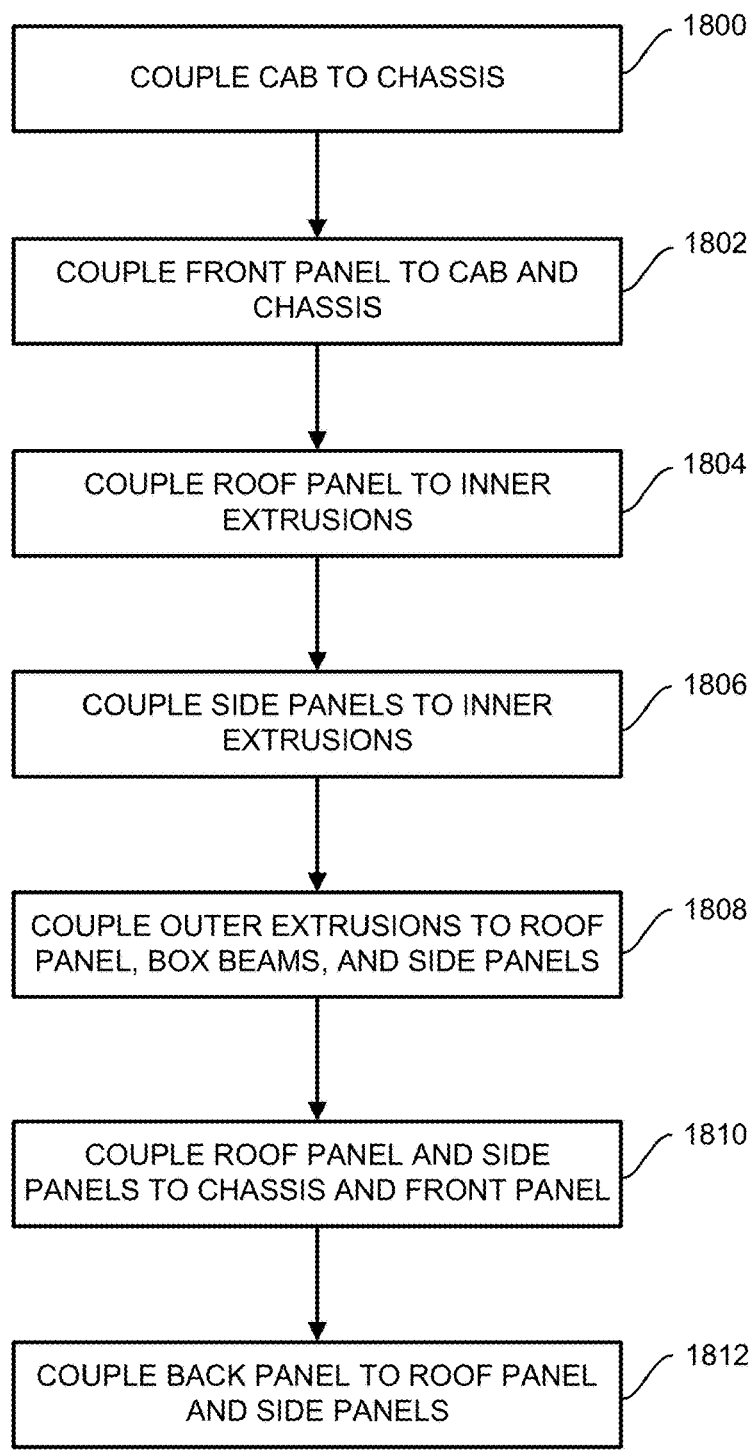
FIG. 18 is a flow diagram illustrating steps in a method to construct a modular vehicle according to the disclosure.

FIG. 18 illustrates a series of steps in construction of a modular vehicle using components as described herein. At block 1800, the cab is coupled to the chassis. At block 1802, the front panel is coupled to the cab and the chassis. At block 1804, the roof panel is coupled to the inner extrusions structural joiner. At block 1806, the side panels are coupled to the inner extrusions of the structural joiner. At block 1808, the outer extrusions are coupled to the roof panel, box beams, and side panels. At block 1810, the roof and side panels are coupled to the chassis and front panel. At block 1812, the back panel is coupled to the roof and side panels.

The concepts disclosed herein may be applied within a number of different devices and systems, including, for example, vehicles, watercraft, residential construction, commercial construction, etc. The specification and drawings are, accordingly, to be regarded in an illustrative rather than a restrictive sense. It should, however, be evident that various modifications and changes may be made thereunto without departing from the broader spirit and scope of the disclosure as set forth in the claims.

What is claimed is:

1. A method for assembling a modular vehicle, comprising the steps of:
   providing a driver compartment including beam receivers;
   providing a chassis that includes protruding beams configured to engage the beam receivers of the driver compartment, the chassis further including a first channel that extends along a first edge of the chassis;
   coupling the driver compartment to the chassis using the beam receivers of the driver compartment and the protruding beams that extend from the chassis;
   coupling a first side panel to the first channel of the chassis, the first side panel including pultruded beams that bear weight;
   coupling a first joiner to the first side panel at a location of the first side panel distal from the first channel; and
   coupling a roof panel to the first joiner.

2. The method of claim 1, wherein:
   the first channel consists of a bottom portion and an exterior side; and
   coupling of the first side panel to the first channel includes bonding the first side panel to at least one of the bottom portion or the exterior side.

3. The method of claim 1, wherein:
   the first channel consists of a bottom portion and an interior side; and
   coupling of the first side panel to the first channel includes bonding the first side panel to at least one of the bottom portion or the interior side.

4. The method of claim 1, wherein coupling of the first joiner to the first side panel includes coupling an inner extrusion of the first joiner to an inner surface of the first side panel and coupling an outer extrusion of the first joiner to an outer surface of the first side panel.

5. The method of claim 1, wherein coupling of the first joiner to the roof panel includes coupling an inner extrusion of the first joiner to an inner surface of the roof panel and coupling an outer extrusion of the first joiner to an outer surface of the roof panel.

6. The method of claim 1, wherein the first joiner includes an inner extrusion and an outer extrusion, and further comprising interspersing a first pultruded beam and a second pultruded beam between the inner and outer extrusions, the first pultruded beam being located proximate to the first side panel and the second pultruded beam being located proximate to the roof panel.

7. The method for assembling a modular vehicle of claim 1, wherein the chassis includes a second channel that extends along a second edge of the chassis, and the method further comprises:
 coupling a second side panel to the second channel, the second side panel including pultruded beams that bear weight;
 coupling a second joiner to the second side panel at a location of the second side panel distal from the second channel; and
 coupling the roof panel to the second joiner.

8. A modular vehicle, comprising:
 a chassis including:
  a first channel that extends along a first edge of the chassis, the chassis including at least one protruding beam that extends from the chassis;
 a driver compartment having at least one beam receiver, the driver compartment coupled to the chassis using the at least one beam receiver that receives the at least one protruding beam that extends from the chassis; and
 a passenger compartment configured on the chassis, comprising:
  a first side panel coupled to the first channel of the chassis, the first side panel including pultruded beams that bear weight;
  a first joiner coupled to the first side panel distal from the first channel, the first joiner including an inner extrusion coupled to an inner surface of the first side panel and an outer extrusion coupled to an outer surface of the first side panel, the first joiner further including pultruded beams interspersed between the inner and outer extrusions; and
  a roof panel including a first portion coupled to the first joiner.

9. The modular vehicle of claim 8, wherein:
 the first channel consists of a bottom portion and an exterior side; and
 coupling of the first side panel to the first channel includes bonding the first side panel to at least one of the bottom portion or the exterior side.

10. The modular vehicle of claim 8, wherein:
 the first channel consists of a bottom portion and an interior side; and
coupling of the first side panel to the first channel includes bonding the first side panel to at least one of the bottom portion or the interior side.

11. The modular vehicle of claim 8, wherein the pultruded beams of the first joiner have lengths substantially commensurate with a length of the first joiner.

12. The modular vehicle of claim 8, wherein at least one of the pultruded beams is proximate the first side panel and has a length substantially commensurate with a length of the first side panel.

13. The modular vehicle of claim 8, wherein at least one of the pultruded beams is proximate the roof panel and has a length substantially commensurate with a length of the roof panel.

14. The modular vehicle of claim 8, wherein the chassis includes a second channel that extends along a second edge of the chassis, and the passenger compartment further comprises:
 a second side panel coupled to the second channel, the second side panel including pultruded beams that bear weight;
 a second joiner coupled to the second side panel distal from the first channel, the second joiner including an inner extrusion coupled to an inner surface of the second side panel and an outer extrusion coupled to an outer surface of the second side panel, the second joiner further including pultruded beams interspersed between the inner and outer extrusions of the second joiner; and
 the roof panel includes a second portion coupled to the second joiner.

15. A modular vehicle, comprising:
 a chassis including a first channel that extends along a first edge of the chassis and a second channel that extends along a second edge of the chassis, the chassis including a protruding structure;
 a driver compartment having a receiver structure, the driver compartment coupled to the chassis using the protruding structure of the chassis and the receiving structure of the driver compartment; and
 a passenger compartment coupled to the driver compartment and the chassis, the passenger compartment comprising:
  a first side panel having at least one pultruded beam coupled to the first channel;
  a second side panel coupled to the second channel;
  a first joiner coupled to the first side panel distal from the first channel;
  a second joiner coupled to the second side panel distal from the second channel; and
  a roof panel including a first portion and a second portion, the first portion being coupled to the first joiner and the second portion being coupled to the second joiner.

16. The modular vehicle of claim 15, wherein:
 the first channel has a length substantially equal to a length of the first side panel; and
 the second channel has a length substantially equal to a length of the second side panel.

17. The modular vehicle of claim 15, wherein:
 the first joiner has a length substantially equal to a length of the first side panel; and
 the second joiner has a length substantially equal to a length of the second side panel.

18. The modular vehicle of claim 15, wherein both the first and second channels are U shaped.

19. The modular vehicle of claim 15, wherein:
 the first channel consists of a first bottom portion, a first interior side and a first exterior side;
 the first side panel is adhesively bonded to at least one of the first bottom portion, the first interior side or the first exterior side;
 the second channel consists of a second bottom portion, a second interior side and a second exterior side; and
 the second side panel is adhesively bonded to at least one of the second bottom portion, the second interior side or the second exterior side.

* * * * *